(12) United States Patent
Kishigami

(10) Patent No.: US 10,557,933 B2
(45) Date of Patent: Feb. 11, 2020

(54) RADAR DEVICE AND POSITION-DETERMINATION METHOD

(71) Applicant: Panasonic Corporation, Osaka (JP)

(72) Inventor: Takaaki Kishigami, Kanagawa (JP)

(73) Assignee: Panasonic Corporation, Osaka (JP)

( * ) Notice: Subject to any disclaimer, the term of this patent is extended or adjusted under 35 U.S.C. 154(b) by 376 days.

(21) Appl. No.: 15/454,735

(22) Filed: Mar. 9, 2017

(65) Prior Publication Data

US 2017/0299711 A1    Oct. 19, 2017

(30) Foreign Application Priority Data

Mar. 14, 2016    (JP) .................................. 2016-049984

(51) Int. Cl.

| | |
|---|---|
| *G01S 13/58* | (2006.01) |
| *G01S 13/524* | (2006.01) |
| *G01S 13/93* | (2006.01) |
| *G01S 13/28* | (2006.01) |
| *G01S 7/288* | (2006.01) |
| *G01S 13/00* | (2006.01) |

(52) U.S. Cl.
CPC .......... *G01S 13/581* (2013.01); *G01S 13/284* (2013.01); *G01S 13/5242* (2013.01); *G01S 13/931* (2013.01); *G01S 13/288* (2013.01); *G01S 2007/2886* (2013.01); *G01S 2013/9375* (2013.01); *G01S 2013/9385* (2013.01)

(58) Field of Classification Search
CPC .. G01S 13/581; G01S 13/5242; G01S 13/931; G01S 13/284; G01S 2013/9385; G01S 2007/2886; G01S 13/288; G01S 2013/9375; G01S 13/53
See application file for complete search history.

(56) References Cited

U.S. PATENT DOCUMENTS

| | | | | |
|---|---|---|---|---|
| 3,737,900 A | * | 6/1973 | Vehrs, Jr. ............ | G01S 13/5242 342/102 |
| 4,568,939 A | * | 2/1986 | Grau ................... | G01S 13/5242 342/104 |
| 5,343,203 A | * | 8/1994 | Chen ................... | G01S 13/9029 342/25 |

(Continued)

FOREIGN PATENT DOCUMENTS

| | | |
|---|---|---|
| EP | 2706374 A1 | 3/2014 |
| JP | 2002-131421 A | 5/2002 |
| JP | 2014-089115 A | 5/2014 |

OTHER PUBLICATIONS

Extended European Search Report, dated Jul. 31, 2017 for the related European Patent Application No. 17159970.7-1812, 8 pages.

*Primary Examiner* — Bernarr E Gregory
(74) *Attorney, Agent, or Firm* — Seed IP Law Group LLP

(57) ABSTRACT

A radar device is mounted on a vehicle, which is a moving object, and includes a doppler correction phase-rotation controller and a phase rotator. Based on the speed of the vehicle, the doppler correction phase-rotation controller calculates a Doppler correction phase-rotation amount for correcting a Doppler frequency due to movement of the vehicle. By using the Doppler correction phase-rotation amount, the phase rotator pre-corrects Doppler frequency components with respect to a radar transmission signal in each transmission interval of the radar transmission signal.

6 Claims, 12 Drawing Sheets

(56) References Cited

U.S. PATENT DOCUMENTS

| | | | | |
|---|---|---|---|---|
| 5,559,517 A | * | 9/1996 | Didomizio | G01S 13/5242 342/156 |
| 7,333,046 B2 | * | 2/2008 | Perry | G01S 13/9029 342/127 |
| 9,354,303 B2 | * | 5/2016 | Asada | G01S 13/5242 |
| 2010/0158152 A1 | * | 6/2010 | Edwards | G01S 13/5242 375/285 |
| 2014/0118184 A1 | | 5/2014 | Minowa et al. | |

* cited by examiner

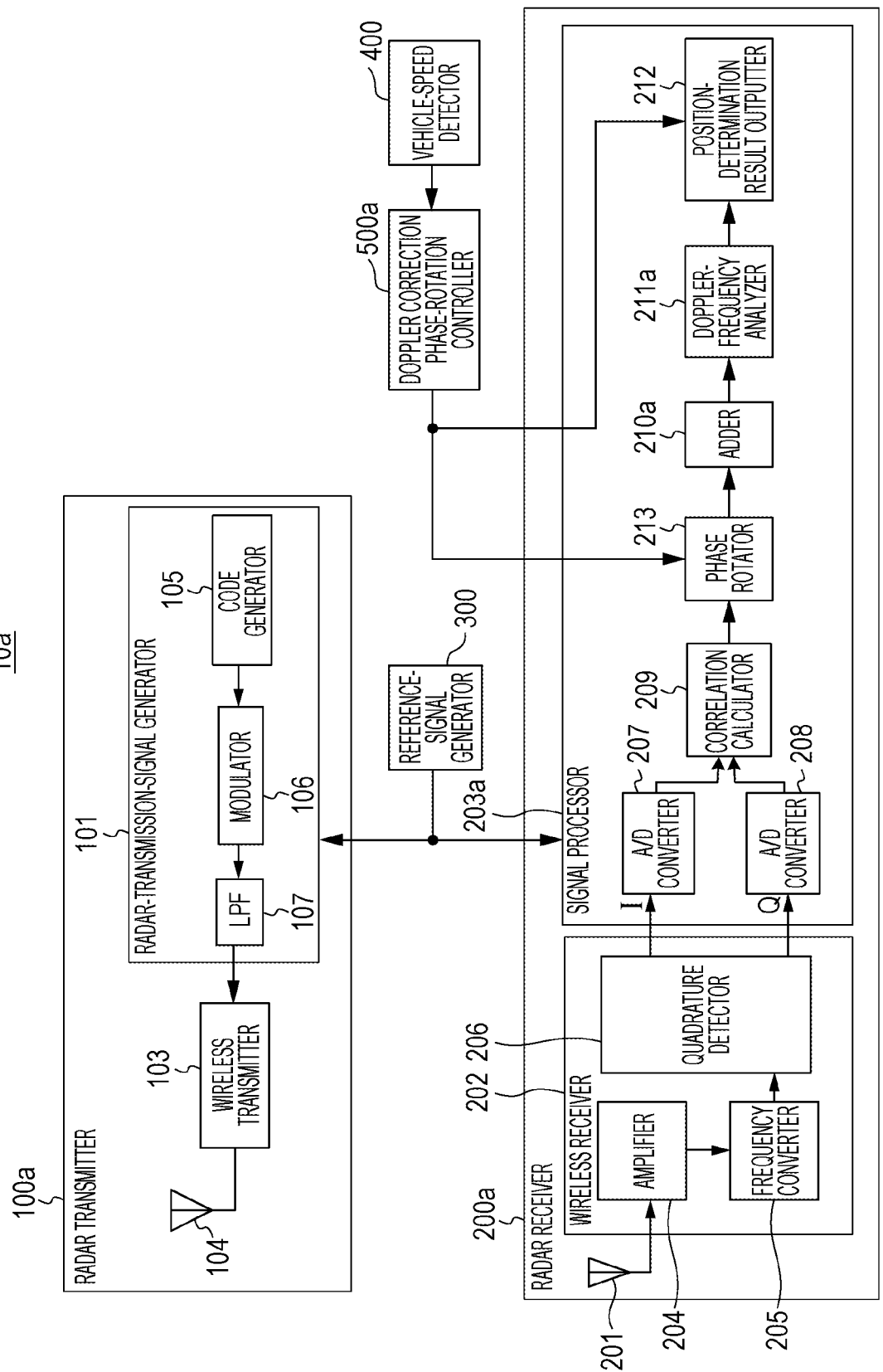

RADAR DEVICE AND POSITION-DETERMINATION METHOD

BACKGROUND

1. Technical Field

The present disclosure relates to a radar device and a position-determination method that detect a relative speed between a radar and a target by detecting a Doppler frequency.

2. Description of the Related Art

In recent years, a study has been conducted on a radar device that can obtain a high resolution and that uses a radar transmission signal having a short wavelength, such as a signal in a microwave or millimeter wave. Also, development of a radar device that detects targets, including pedestrians, other than vehicles in a wide-angle range is also needed in order to improve the outdoor safety.

When at least one of a target and a radar device moves, a radar reflection wave is affected by a Doppler frequency shift corresponding to an amount proportional to a relative speed between the target and the radar device. Thus, by detecting a Doppler frequency of the target, the radar device can calculate the relative speed between the target and the radar device.

For example, Japanese Unexamined Patent Application Publication No. 2002-131421 discloses a method for detecting a Doppler frequency by using fast Fourier transform (FFT) processing. In the method, FFT processing is performed to convert reception pulses corresponding to transmission pulses, for example, at N different time points into a frequency domain, and a Doppler frequency is detected based on the spectrum peak. A method using a discrete Fourier transform (DFT), instead of an FFT, may be employed to detect a Doppler frequency. Since a method using FFT processing involves a smaller amount of calculation than a method using DFT processing and is more often used, a method using FFT processing will be described below. Even when the DFT processing is employed as the method for detecting a Doppler frequency, a similar advantage is also obtained.

With the method using FFT processing, when reception pulses include Doppler frequency components that exceed a sampling theorem, Doppler frequency aliasing occurs in the result of the FFT. For example, Japanese Unexamined Patent Application Publication No. 2014-89115 discloses a method employing FFT processing. In the method, aliasing components of a Doppler frequency are detected, and the detected aliasing components are corrected to thereby increase the maximum-speed detection range.

Japanese Unexamined Patent Application Publication No. 2014-89115 discloses a system (a stagger system) that employs FFT processing to detect and correct aliasing components of a Doppler frequency to thereby increase the maximum-speed detection range.

In the stagger system, transmission is performed in two types of pulse repetition interval (PRI). Accordingly, in order to make addition gains of peak Doppler frequency spectra obtained in two types of PRI equal to each other, the stagger system requires twice the transmission time of a system that does not use the stagger system.

SUMMARY

One non-limiting and exemplary embodiment facilitates providing a radar device that can reduce the transmission time and can increase the maximum-speed detection range.

In one general aspect, the techniques disclosed in the present disclosure feature a radar device directed to a radar device mounted on a moving object. The radar devices includes: a radar transmitter, which in operation, repeatedly transmits a corrected radar transmission signal in each radar transmission interval $T_r$, the corrected radar transmission signal including pulse compression codes and having a corrected Doppler frequency component based on a movement speed of the moving object; a radar receiver, which in operation, includes one or more reception branches, each receiving a reflection wave signal resulting from reflection of the corrected radar transmission signal by a target; and a doppler correction phase-rotation controller, which in operation, determines a Doppler correction phase-rotation amount for correcting the Doppler frequency component, based on the movement speed of the moving object. The radar transmitter includes: a radar-transmission-signal generator, which in operation, generates a radar transmission signal; and a phase rotator, which in operation, corrects the radar transmission signal for each radar transmission interval $T_r$, based on the Doppler correction phase-rotation amount, and that outputs the corrected radar transmission signal. The radar receiver includes a position-determination result outputter, which in operation, calculates a position-determination result of the target by using a result of Doppler-frequency analysis on the reflection wave signal received by the one or more reception branches and the Doppler correction phase-rotation amount.

A mode obtained by conversion between an arbitrary combination of the above-described constituent elements or an aspect of the present disclosure and a method, a device, a system, a recording medium (including a computer-readable non-transitory recording medium), a computer program, or the like is also valid as an aspect of the present disclosure.

According to one aspect of the present disclosure, even when the detection range of targets is set to be large, influences on a Doppler frequency which are caused by movement of a moving object can be corrected in a desirable manner.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9A is a block diagram illustrating one example of the configuration of a radar device according to a second embodiment;

DETAILED DESCRIPTION

A pulse radar device has been known, for example, that repeatedly transmits a pulse wave and detects a speed relative to a target on the basis of a reflection wave from the target. A wide-angle pulse radar that detects at least one of a vehicle and a pedestrian in a wide-angle range receives signals resulting from mixing of a plurality of reflection waves from a target (e.g., a vehicle) that exists at a short distance and a target (e.g., a pedestrian) that exists at a long distance. Thus, a radar transmitter that transmits a radar wave needs to have a configuration that transmits a pulse wave or modulated pulse wave having an autocorrelation characteristic that results in a low range sidelobe (this characteristic is hereinafter referred to as a "low range sidelobe characteristic"). Also, a radar receiver that receives radar waves reflected by targets needs to have a configuration having a wide reception dynamic range.

Known examples of a radar device using a pulse wave (or a modulated pulse wave) for obtaining the low range sidelobe characteristic include pulse compression radar devices using Barker codes, M-sequence codes, complementary codes, or the like. A case in which complementary codes are used will be described below as one example. Complementary codes include two code sequences (hereinafter referred to as "complementary code sequence $a_n$ and $b_n$, where $n=1, \ldots, L$, and L represents a code sequence length). Autocorrelation calculations of the two code sequences are given by:

$$R_{aa}(\tau) = \sum_{n=1}^{L} a_n a_{n+\tau}^* \quad (1)$$

$$R_{bb}(\tau) = \sum_{n=1}^{L} b_n b_{n+\tau}^*$$

In this case, $a_n$ is referred to as a pulse, and $a_1, a_2, \ldots,$ and $a_L$ are referred to as sub-pulses.

In expression (1), for $n>L$ or $n<1$, $a_n=0$ and $b_n=0$ are given. Also, the asterisk represents a complex conjugate operator. An addition value of autocorrelation-value calculation results ($R_{aa}(\tau)$ and $R_{bb}(\tau)$) derived according to expression (1) is a peak value when a delay time (a shift time) $\tau$ is 0, and is 0 when the delay time $\tau$ has a value other than 0 since there is no range sidelobe, as illustrated in FIG. 1 and given in:

$$R_{aa}(\tau) + R_{bb}(\tau) \neq 0, \text{ when } \tau=0$$

$$R_{bb}(\tau) + R_{bb}(\tau) = 0, \text{ when } \tau \neq 0 \quad (2)$$

Figure 1:
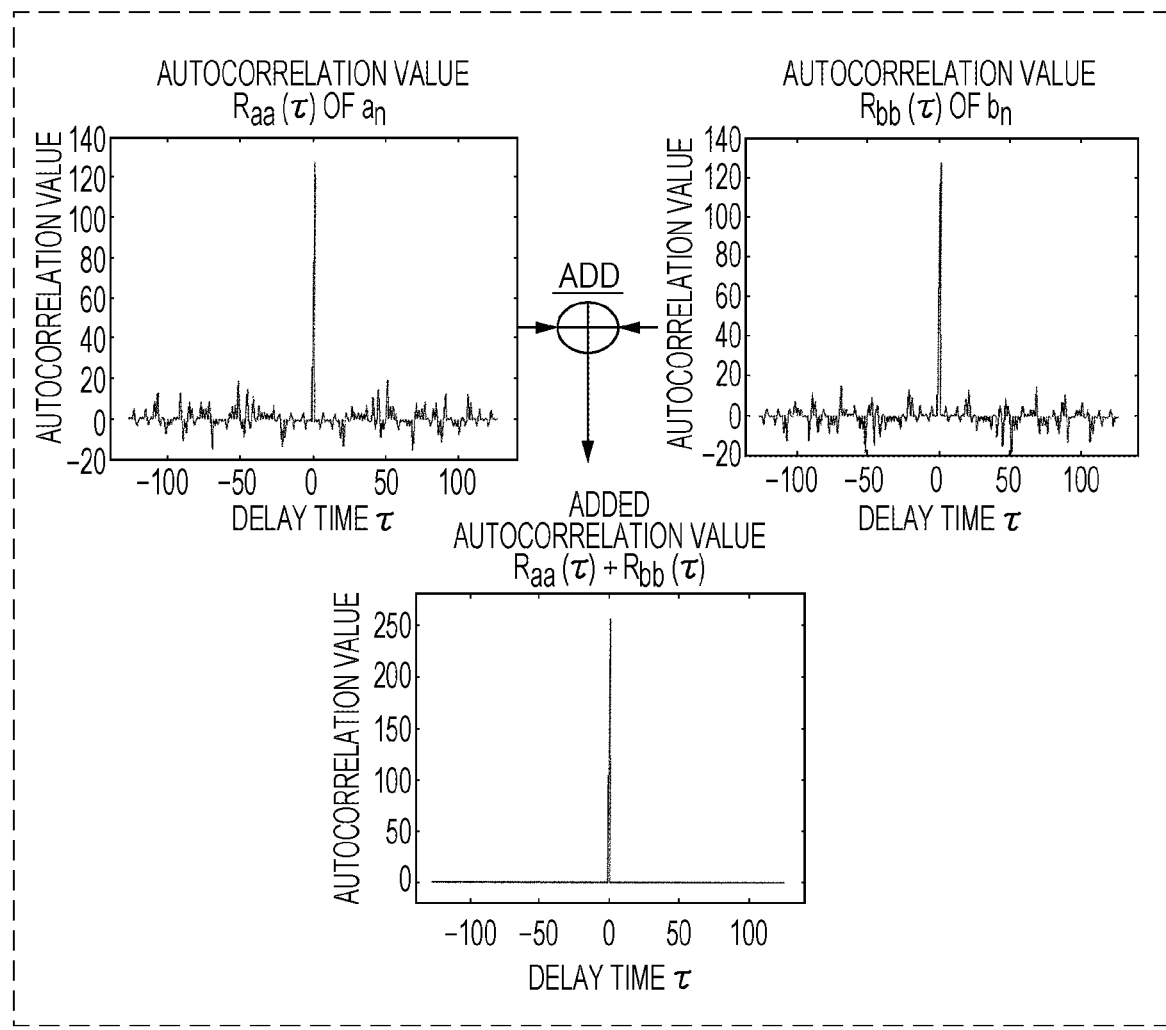
FIG. 1 includes graphs for describing an addition value of autocorrelation-value calculation results ($R_{aa}(\tau)$ and $R_{bb}(\tau)$)

FIG. 1 includes graphs for describing the addition value of the autocorrelation-value calculation results ($R_{aa}(\tau)$ and $R_{bb}(\tau)$). In FIG. 1, the horizontal axis represents the delay time ($\tau$) in autocorrelation value calculation, and the vertical axis represents an autocorrelation-value calculation result.

Figure 2:
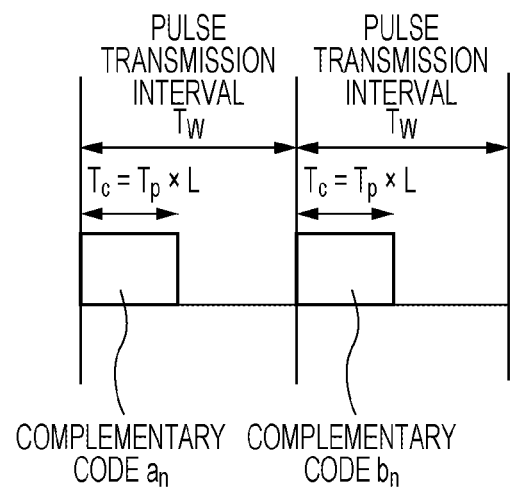
FIG. 2 is a diagram for describing an example in which a pulse compression radar transmits complementary codes $a_n$ and $b_n$ in a time division manner.

FIG. 2 illustrates complementary codes of a pulse compression radar that transmits, in a time division manner, a high frequency transmission signal generated based on the complementary code $a_n$ and a high frequency transmission signal generated based on the complementary code $b_n$ through switching between each of the signals at each predetermined transmission interval. FIG. 2 is a diagram for describing an example in which the pulse compression radar transmits the complementary codes $a_n$ and $b_n$ in a time division manner.

A method for generating complementary codes is disclosed, for example, in Budisin, S. Z., "New complementary pairs of sequences", Electron. Lett., 1990, 26, (14), pp. 881-883. Specifically, for example, a pulse compression radar in the related art sequentially generates complementary codes having a code sequence length L=4, 8, 16, 32, ..., 2P on the basis of a code sequence a=[1 1] and a code sequence b=[1 −1] that have complementarity. The code sequences a and b have elements "1" and "−1". With the pulse compression radar in the related art, the dynamic range (the reception dynamic range) required for the reception increases, as the code sequence length of the complementary codes increases. In the pulse compression radar in the related art, on the other hand, the peak sidelobe ratio (PSR) decreases, as the code sequence length of the complementary codes decreases. Thus, even when a plurality of reflection waves from a target at a short distance and a target at a long distance are mixed, it is possible to reduce the required reception dynamic range.

When M-sequence codes are used instead of complementary codes, the PSR is given by 20 log(1/L) [dB]. Hence, in order to obtain a low range sidelobe with M-sequence codes, the pulse compression radar in the related art requires a code sequence length L (e.g., L=1024 for PSR=60 dB) that is larger than that of the complementary codes.

Also, the pulse radar device in the related art which transmits/receives pulse radar signals can calculate a relative speed between the radar device and a target by detecting a Doppler frequency of the target. In order to accurately calculate the relative speed, it is desired that the pulse radar device in the related art accurately detect a Doppler frequency of the target.

As an example of a method for detecting a Doppler frequency, a method using fast Fourier transform (FFT) processing is available. In the method using FFT processing, a pulse radar device in the related art performs FFT processing to convert reception pulses corresponding to transmission pulses at N different time points into a frequency domain and detects a Doppler frequency based on the spectrum peak. Also, in another method for detecting a Doppler frequency, reception pulses corresponding to transmission pulses at $N_c \times N$ different time points (where $N_c$ is an integer) are subjected to coherent addition processing at $N_c$ at a time, and then the resulting reception pulses are converted into a frequency domain through FFT processing to detect a Doppler speed based on the spectrum peak.

A method using a discrete Fourier transform (DFT), instead of an FFT, may be employed to detect a Doppler frequency. Since a method using FFT processing involves a smaller amount of calculation than a method using DFT processing and is more often used, a method using FFT processing will be described below. Even when the DFT processing is employed as the method for detecting a Doppler frequency, a similar advantage is also obtained.

In the method using FFT processing, since the pulse radar device in the related art uses N reception pulses to perform Doppler-frequency analysis, an addition gain of N times in SNR is obtained at a peak Doppler frequency spectrum. Also, even when two or more reflection waves from the same distance are received, the pulse radar device in the related art can detect Doppler frequencies of respective reflection signals. The ability of resolving a plurality of Doppler frequencies (i.e., Doppler frequency resolution) can be enhanced by increasing the transmission time of N transmission pulses.

However, with the method using FFT processing, when the Doppler frequency of a target becomes larger than $1/(2\Delta T)$ with respect to a transmission time interval $\Delta T$ of a transmission pulse, the pulse radar device in the related art dose not satisfy the sampling theorem, thus causing Doppler frequency aliasing in the result of the FFT. As disclosed in Japanese Unexamined Patent Application Publication No. 2002-131421, in the pulse radar device in the related art, N, reception pulses corresponding to transmission pulses at different ($N_c \times N$) time points are subjected to coherent addition processing, and when the Doppler frequency of a target which is obtained by FFT processing after the coherent addition processing becomes larger than $1/(2N_c\Delta T)$, the sampling theorem is not satisfied, thus causing Doppler frequency aliasing in the result of the FFT.

A stagger system has been known as a technique for preventing a decrease in the accuracy of detecting Doppler frequencies, the decrease being caused by Doppler frequency aliasing, as described above. In the stagger system, Doppler-frequency analysis is performed through switching of two PRIs to thereby correct aliasing of Doppler frequencies detected at the two PRIs, by using a characteristic difference between each of the Doppler frequencies.

In the stagger system, Doppler frequency detection involving FFT processing is required for each of the two types of PRI. That is, in the stagger system, since the transmission needs to be performed at two types of PRI, twice the transmission time taken by other systems is required in order to make the addition gains of peak Doppler frequency spectra obtained at the two types of PRI equal to each other. In addition, in the stagger system, when a plurality of reflection waves from the same distance are received, pairing between each of FFT spectrum peaks at the two types of PRI becomes complicated.

When the radar device is mounted on a moving object, such as a vehicle, Doppler frequencies included in reflection waves from a target includes Doppler frequencies due to movement of the target and movement of the moving object. For example, when the moving object travels straight, a Doppler frequency $f_{dm}$ included in reflection waves from a group of stationary targets that exist in the vicinity of the moving object depend on a speed $V_c$ of the moving object and an azimuth $\theta$ of the group of stationary targets, as in:

$$f_{dm} = 2V_c \sin\theta/\lambda \qquad (3)$$

where $\lambda$ indicates the wavelength of the carrier frequency of a radar transmission wave. The azimuth $\theta$ in the direction lateral to the moving object is 0.

Expression (3) is an equation for a case in which a target is stationary, and when the target is moving, Doppler frequencies included in reflection waves from a target have a value obtained by adding a Doppler frequency $f_d$ detected when the moving object is stationary to the Doppler frequency $f_{dm}$ (given by expression (3)) due to movement of the moving object (i.e., $f_{dm}+f_d$).

Figure 3:
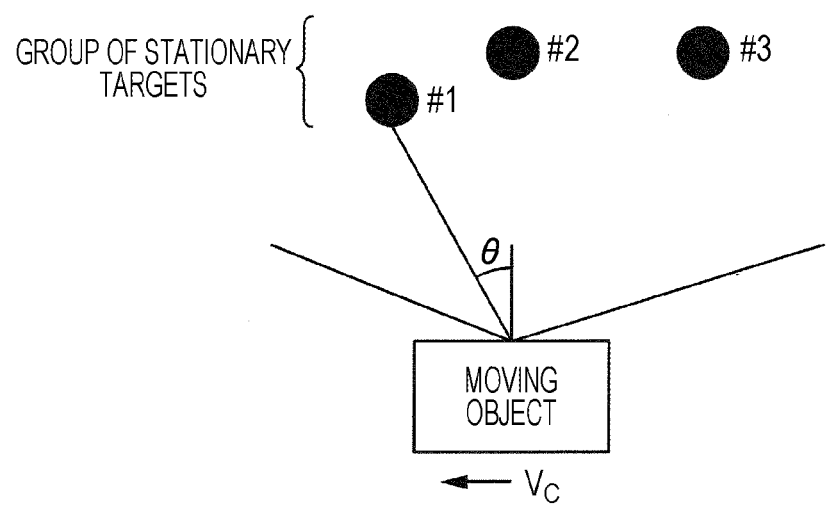
FIG. 3 is a diagram illustrating positional relationships between a moving object and a group of stationary targets that exist in the vicinity thereof.

FIG. 3 is a diagram illustrating positional relationships between the moving object and a group of stationary targets that exist in the vicinity thereof. In FIG. 3, the radar device is mounted on a right-side surface in the traveling direction of the moving object, and an angle orthogonal to the traveling direction of the moving object (i.e., a direction lateral to the moving object) is assumed to be $\theta=0$ (in FIG. 3, the direction directly in front of the radar device is $\theta=0$). In this case, depending on whether the stationary targets are located ahead of or behind the radar device (i.e., the center of the moving object), the polarity (positive and negative) of the Doppler frequencies included in the reflection waves from the stationary targets changes. Also, when the radar device is mounted on a front side of the moving object, and the detection range of the radar device is in front of the moving object, the group of stationary targets is affected by a positive Doppler frequency shift. The "direct front of the radar device" corresponds to a plane from which radar signals of the radar device are radiated.

In this case, when the detection angle range of the radar device ranges from $\gamma_S$ to $\gamma_E$, the Doppler frequencies of a group of stationary targets that exist in the detection angle range $[\gamma_S, \gamma_E]$ have a spread corresponding to the detection angle range and an installation angle at which the radar device is mounted on the moving object.

For example, when a radar device having a detection angle range $[-5°, 5°]$, which is a relatively small detection angle range of 10°, is mounted with its direct front being directed to the front side of the vehicle (i.e., the direction of $\theta=90°$), the Doppler frequencies of the group of stationary targets that exist in the angle range $\theta$ of 85° to 95° is a range of $2V_c/\lambda$ to $1.992V_c/\lambda$. Hence, the spread of the Doppler frequencies of the group of stationary targets is small, and thus the Doppler frequencies can be regarded as being a substantially constant frequency.

On the other hand, when a radar device having a detection angle range $[-60°, 60°]$, which is a relatively large detection angle range of 120°, is mounted with its direct front being directed to the front side of the vehicle (i.e., the direction of $\theta=90°$), the Doppler frequencies of the group of stationary targets that exist in the angle range $\theta$ of 150° to 30° is a range of $2V_c/\lambda$ to $V_c/\lambda$. Hence, the spread of the Doppler frequencies of the group of stationary targets becomes larger than the detection angle range of 10°.

Also, as the speed $V_c$ of the moving object increases, the spread of the Doppler frequencies increase. For example, when the speed $V_c$ of the moving object increases from 10 km/h to 100 km/h by a factor of 10, the spread of the Doppler frequencies also increases by a factor of 10. That is, as the speed $V_c$ of the moving object increases, a required maximum-speed detection range of the radar device increases.

In view of such a situation, in a radar device mounted on a moving object, there are demands for a radar device that can suppress an increase in the transmission time and can increase the maximum-speed detection range. A radar device according to each embodiment of the present disclosure can increase the maximum-speed detection range by correcting, before performing FFT processing, a Doppler frequency shift due to movement of a moving object. The radar device according to each embodiment will be described below.

First Embodiment

A first embodiment of the present disclosure will be described below in detail with reference to the accompanying drawings. In the embodiments described below, the same constituent elements are denoted by the same reference numerals, and redundant descriptions are not given.

[Configuration of Radar Device 10]

Figure 4A:
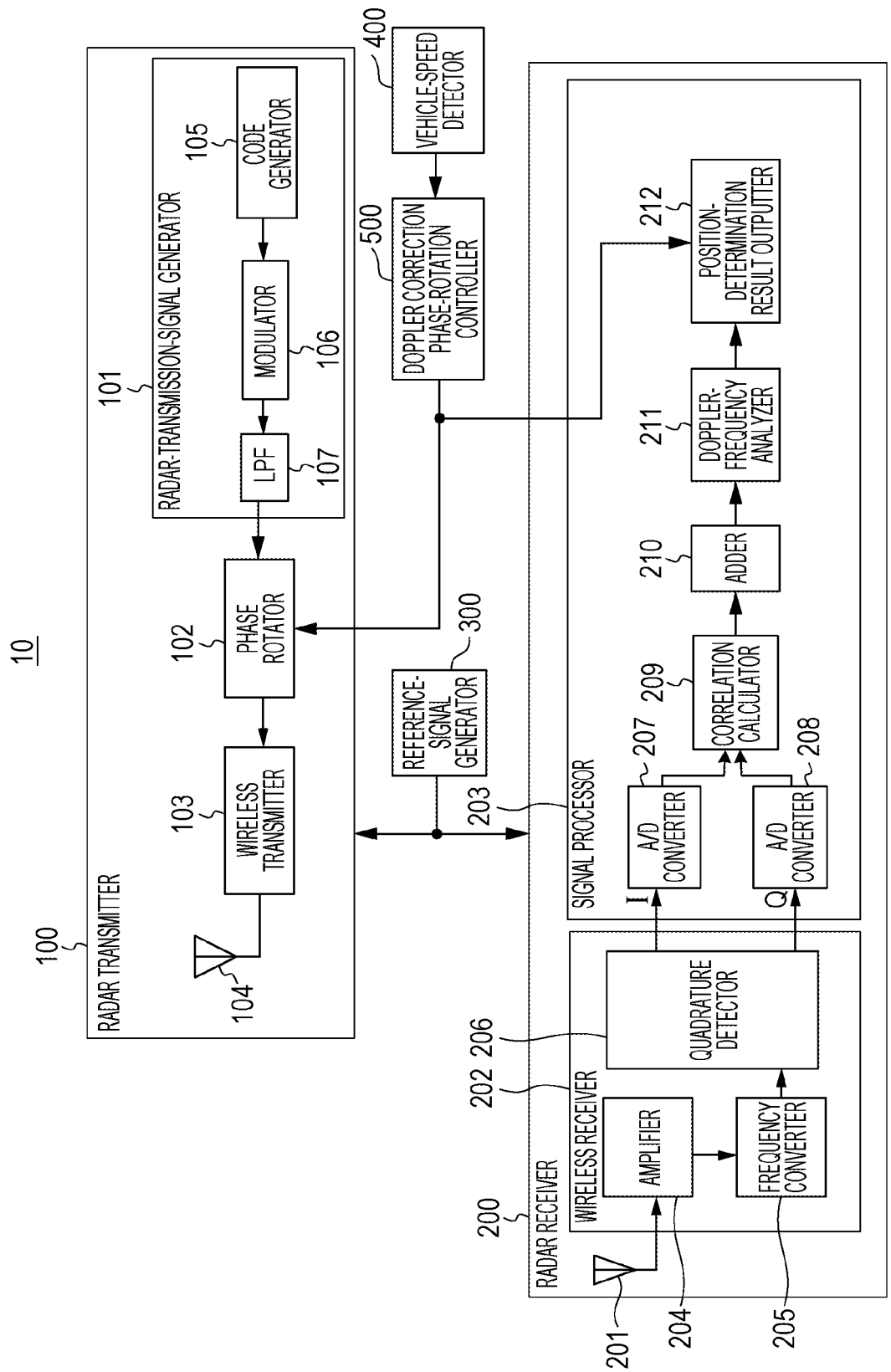
FIG. 4A is a block diagram illustrating one example of the configuration of a radar device according to a first embodiment.

FIG. 4A is a block diagram illustrating the configuration of a radar device 10 according to the first embodiment. As illustrated in FIG. 4A, the radar device 10 includes a radar transmitter 100, a radar receiver 200, a reference-signal generator 300, a vehicle-speed detector 400, and a doppler correction phase-rotation controller 500. The radar device 10 is assumed to be mounted on a vehicle (not illustrated), which is one example of a moving object.

As illustrated in FIG. 4A, on the basis of a reference signal received from the reference-signal generator 300, the radar transmitter 100 generates a high-frequency radar signal (a radar transmission signal). The radar transmitter 100 then repeatedly transmits a radar transmission wave at a predetermined radar transmission interval $T_r$.

The radar receiver 200 receives reflection waves, which are radar transmission waves reflected by targets (not illustrated), via a reception antenna 201. On the basis of the reference signal input from the reference-signal generator 300 and a Doppler correction phase-rotation amount (described below) output from the doppler correction phase-rotation controller 500, the radar receiver 200 performs signal processing on the reflection waves received using the reception antenna 201 and performs, for example, at least one of detecting the presence/absence of any target and estimating the distance between the target(s) and the radar. The radar receiver 200 may use an array antenna provided with a plurality of reception antennas to perform signal processing on the reflection waves to thereby estimate the arrival direction(s) of the target(s). In the signal processing, the radar receiver 200 performs coherent integration processing and Doppler-frequency analysis processing (including, for example, Fourier transform processing). The targets are objects to be detected by the radar device 10 and include, for example, at least one of a vehicle and a person.

The reference-signal generator 300 is connected to each of the radar transmitter 100 and the radar receiver 200. The reference-signal generator 300 supplies the reference signal to both the radar transmitter 100 and the radar receiver 200. By using the reference signal, the radar device 10 causes processing in the radar transmitter 100 and processing in the radar receiver 200 to synchronize with each other.

For example, by using a vehicle-speed sensor, the vehicle-speed detector 400 detects a movement speed $V_c$ of a vehicle (not illustrated) on which the radar device 10 is mounted. At a measurement start timing of the radar device 10, the doppler correction phase-rotation controller 500 determines a Doppler correction phase-rotation amount on the basis of the vehicle speed $V_c$ output from the vehicle-speed detector 400 and a radar installation angle in the vehicle on which the radar device 10 is mounted, in order to pre-correct Doppler components due to movement of the vehicle.

In this case, the radar device 10 measures, for example, the distance between an object and the vehicle by transmitting a radar transmission signal (described below) in each period obtained by repeating the radar transmission interval $T_r$ $N_c \times N_p$ times. That is, one measurement period is given by $N_c \times N_p \times T_r$, and the doppler correction phase-rotation controller 500 determines a Doppler correction phase-rotation amount at each measurement start timing (i.e., in an initial radar transmission interval in a measurement period). The radar device 10 uses one or more measurement periods to measure the distance between an object and the vehicle.

Figure 5:
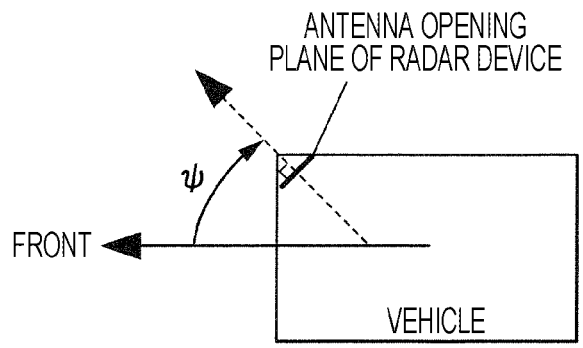
FIG. 5 is a top view illustrating a relationship between a vehicle and the installation angle of the radar device.

FIG. 5 is a top view illustrating a relationship between the vehicle and the installation angle of the radar device 10. In this case, the radar installation angle is an angle $\Psi$ defined by a direction orthogonal to an opening plane of the antennas mounted on the radar device and a direction that is directly in front of the vehicle, as illustrated in FIG. 5. In FIG. 5, a Doppler frequency $f_{dm}$ due to movement of the vehicle can be represented by:

$$f_{dm} = \frac{2V_c \cos\psi}{\lambda} \qquad (4)$$

where $\lambda$ indicates the wavelength of the carrier frequency of the radar transmission wave.

When the detection angle of the radar device is large, the Doppler frequency $f_{dm}$ due to movement of the vehicle may be set as in:

$$f_{dm} = \frac{f_{dc\_max} + f_{dc\_min}}{2} \qquad (5)$$

In this case, when the detection angle range of the radar device ranges from $\gamma_S$ to $\gamma_E$ with respect to a direction orthogonal to the opening plane of the antenna mounted on the radar device (i.e., with respect to the direction directly in front of the vehicle), the maximum value of Doppler frequencies of a group of stationary targets that exist in the detection angle range $[\gamma_S, \gamma_E]$ is represented by $f_{dc\_max}$, and the minimum value of Doppler frequencies of the group of stationary targets that exist in the detection angle range $[\gamma_S, \gamma_E]$ is represented by $f_{dc\_min}$.

On the basis of the Doppler frequency $f_{dm}$ due to movement of the vehicle and the radar transmission interval $T_r$, the doppler correction phase-rotation controller 500 determines a Doppler correction phase-rotation amount $\phi_{dm}$, which is used to pre-correct Doppler components due to the movement of the vehicle, by using:

$$\phi_{dm} = 2\pi f_{dm} T_r \qquad (6)$$

Doppler correction phase-rotation amounts $\phi_{dm}$ for respective values of Doppler frequencies $f_{dm}$ and radar transmission intervals $T_r$ may be tabularized in advance so that, during determination of the Doppler correction phase-rotation amount $\phi_{dm}$, the doppler correction phase-rotation controller 500 selects the Doppler correction phase-rotation amount $\phi_{dm}$ that is the closest to the measured Doppler frequency $f_{dm}$ and the radar transmission interval $T_r$, rather than calculating the Doppler correction phase-rotation amount each time the measurement is performed. The doppler correction phase-rotation controller 500 determines the Doppler correction phase-rotation amount $\phi_{dm}$ at a measurement start timing (i.e., the initial radar transmission interval in a measurement period). The Doppler correction phase-rotation amount $\phi_{dm}$ is assumed to be constant in the measurements in each measurement period.

[Description of Radar Transmitter 100]

As illustrated in FIG. 4A, the radar transmitter 100 includes a radar-transmission-signal generator 101, a phase rotator 102, a wireless transmitter 103, and a transmission antenna 104.

The radar-transmission-signal generator 101 generates a timing clock obtained by multiplying the reference signal input from the reference-signal generator 300 by a predetermined number and generates a radar transmission signal on the basis of the generated timing clock. The radar-transmission-signal generator 101 then repeatedly outputs the radar transmission signal at the predetermined radar transmission interval $T_r$. A radar transmission signal r(n, M) is given by r(n, M)=I(k, M)+jQ(k, M), where j indicates an imaginary unit, k indicates a discrete time point, and M indicates the ordinal number of the radar transmission interval.

The radar-transmission-signal generator 101 includes a code generator 105, a modulator 106, and a low-pass filter (LPF) 107.

The code generator 105 generates codes $a_n$ (n=1, . . . L) of a code sequence with a code length L for each radar transmission interval $T_r$. The codes $a_n$ are pulse compression codes. Examples of the code sequence include an M-code sequence, a Barker code sequence, and a complementary code sequence (including, for example, a Golay code sequence and a Spano code sequence).

For example, when a complementary code sequence is used as the code sequence, the code generator 105 generates paired codes $P_n$ and $Q_n$ (corresponding to $a_n$ and $b_n$ illustrated in FIG. 1), which are alternately transmitted at each radar transmission interval. That is, in the Mth radar transmission interval (represented as "$T_r[M]$"), the code generator 105 outputs the codes $P_n$ to the modulator 106 as the pulse compression codes $a_n$, and in the subsequent (M+1)th radar transmission interval (represented as "$T_r[M+1]$"), the code generator 105 outputs the codes $Q_n$ to the modulator 106 as the pulse compression codes.

Similarly, in the (M+2)th radar transmission interval and the radar transmission intervals subsequent thereto, the code generator 105 repeatedly generates codes $P_n$ and $Q_n$ in every two consecutive radar transmission intervals and outputs the generated codes $P_n$ and $Q_n$ to the modulator 106. In this case, in a single measurement, transmission is performed in a period obtained by repeating the radar transmission interval $T_r$ plurality of times given by "the number of additions, $N_p$, in an adder 210 (described below)"×"$N_c$ indicating an FFT size in a doppler-frequency analyzer 211 (described below)", where M=1, . . . , $N_c \times N_p$. That is, each measurement period is given by $N_c \times N_p \times T_r$.

The modulator 106 performs pulse modulation (e.g., amplitude modulation (amplitude shift keying (ASK)) or phase modulation (phase shift keying) on the codes $a_n$ input from the code generator 105 and outputs modulated signals to LPF 107.

Of the modulated signals input from the modulator 106, the LPF 107 outputs signal components lower than or equal to a predetermined restriction band as a baseband radar transmission signal.

The phase rotator 102 gives the Doppler correction phase-rotation amount $\phi_{dm}$, input from the doppler correction phase-rotation controller 500, to the radar transmission signal input from the LPF 107. That is, the phase rotator 102 generates a signal obtained by giving phase rotation in expression (7) below to the baseband radar transmission signal r(n, M)=I(n, M)+jQ(n, M) and outputs the generated signal to the wireless transmitter 103.

$$\exp[-j\{\phi_{dm}(M-1)\}]r(n,M) \qquad (7)$$

The wireless transmitter 103 performs frequency conversion on the radar transmission signal input from the LPF 107 to generate a radar transmission signal in a carrier frequency (a radio frequency (RF)) band, amplifies the radar transmission signal to a predetermined transmission power P [dB] by using a transmission amplifier, and outputs the amplified radar transmission signal to the transmission antenna 104. The transmission antenna 104 transmits the radar transmission signal, input from the wireless transmitter 103, as a radar transmission wave within an predetermined angle range in a horizontal plane. The predetermined angle range means that the directivity is, for example, an angle range of $\gamma_S$ to $\gamma_E$ being approximately a half-value width centered on a direction orthogonal to the antenna opening plane. For example, the angle range ($\gamma_S$-$\gamma_E$) is a range of about 30° to 150°.

Figure 6:
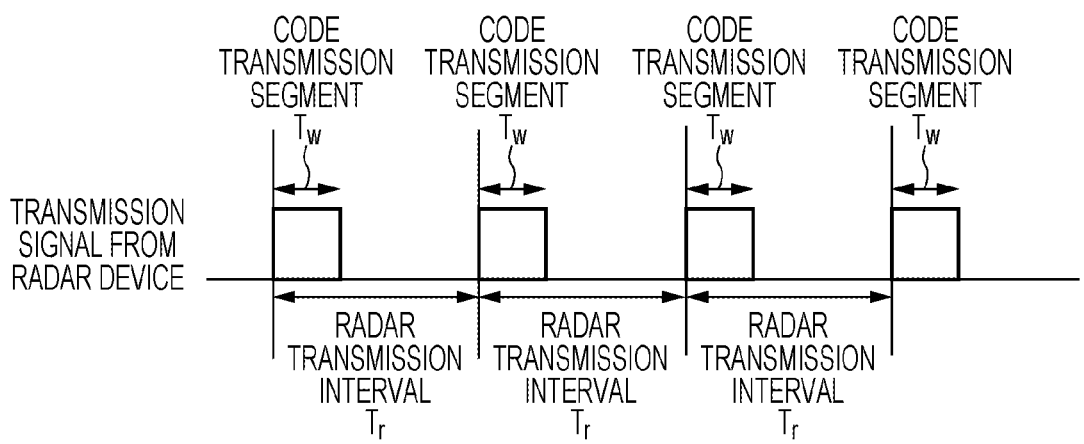
FIG. 6 is a diagram illustrating one example of a radar transmission signal transmitted from a radar transmitter.

FIG. 6 is a diagram illustrating one example of the radar transmission signal transmitted from the radar transmitter 100. In FIG. 6, the radar transmitter 100 transmits a pulse code sequence with a code length L in a code transmission segment $T_w$ in each radar transmission interval $T_r$. In the code transmission segment $T_w$, the radar transmitter 100 transmits a pulse code sequence, and in the remaining segment "$T_r$-$T_w$", the radar transmitter 100 does not transmit a pulse code sequence (i.e., the segment "$T_r$-$T_w$" is a signal-less segment). Since the radar transmitter 100 performs pulse modulation using $N_o$ samples for each pulse code (sub-pulse) of the pulse code sequence $a_n$, each code transmission segment Tw includes a signal of $N_r$, (=$N_o \times L$) samples. That is, the sampling rate in the modulator 106 is ($N_o \times L$)/$T_w$. The signal-less segment ($T_r$-$T_w$) also includes $N_u$, samples.

Figure 7:
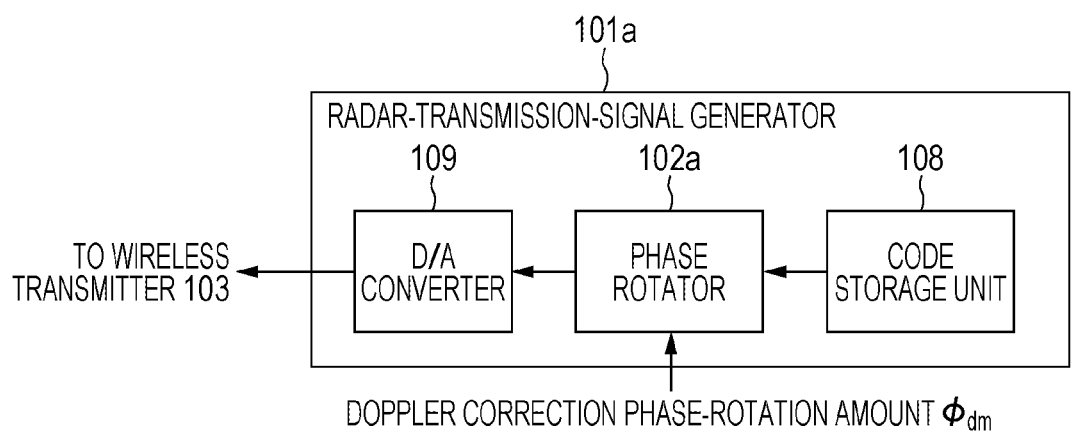
FIG. 7 is a diagram illustrating a modification of a radar-transmission-signal generator.

The radar transmitter 100 may include a radar-transmission-signal generator 101a illustrated in FIG. 7 instead of the radar-transmission-signal generator 101. FIG. 7 is a block diagram illustrating a modification of the radar-transmission-signal generator 101. The radar-transmission-signal generator 101a includes a code storage unit 108, a phase rotator 102a, and a digital-to-analog (D/A) converter 109, instead of the code generator 105, the modulator 106, and the LPF 107 illustrated in FIG. 4A. In FIG. 7, the code storage unit 108 pre-stores generated code sequences therein and sequentially reads the code sequences in a cyclic manner. The phase rotator 102a performs processing, which is similar to that of the above-described phase rotator 102, on each code sequence input from the code storage unit 108. The D/A converter 109 converts a digital signal input from the phase rotator 102a into an analog baseband signal.

[Description of Radar Receiver 200]

Next, a description will be given of the configuration of the radar receiver 200. In FIG. 4A, the radar receiver 200 includes the reception antenna 201, a wireless receiver 202, and a signal processor 203.

The reception antenna 201 receives reflection wave signals reflected by a target and outputs the received reflection wave signals to the wireless receiver 202.

A timing clock generator (not illustrated) generates a timing clock obtained by multiplying the reference signal input from the reference-signal generator 300 by a predetermined number, and the wireless receiver 202 operates based on the generated timing clock. In FIG. 4A, the wireless receiver 202 includes an amplifier 204, a frequency converter 205, and a quadrature detector 206.

The amplifier 204 amplifies the level of the reception signals input from the reception antenna 201 into a predetermined level. The frequency converter 205 converts the frequency of the amplified reception signals from a wireless frequency band into a baseband. The quadrature detector 206 converts the baseband reception signals into baseband reception signals including in-phase signals (I signals) and quadrature-phase signals (Q signals) and outputs the resulting signals to the signal processor 203.

The signal processor 203 includes analog-to-digital (A/D) converters 207 and 208, a correlation calculator 209, the aforementioned adder 210, the aforementioned doppler-frequency analyzer 211, and a position-determination result outputter 212.

The I signals from the quadrature detector 206 are input to the A/D converter 207. The Q signals from the quadrature detector 206 are input to the A/D converter 208. The A/D converter 207 samples the baseband signals including the I signals at discrete time points to thereby convert the I signals into digital data. The A/D converter 208 samples the baseband signals including the Q signals at discrete time points to thereby convert the Q signals into digital data.

During the sampling, each of the A/D converters 207 and 208 obtains $N_s$ discrete samples per time $Tp(=Tw/L)$ for one sub-pulse of a radar transmission signal. That is, the number of oversamples per sub-pulse is $N_s$.

In the following description, using an I signal Ir(k, M) and a Q signal Qr(k, M) the baseband reception signals output from the A/D converters 207 and 208 at a discrete time point k in the Mth radar transmission interval $T_r[M]$ are given as complex number signals x(k, M)=Ir(k, M)+jQr(k, M), where j indicates an imaginary unit. For the discrete time k, a starting point of the radar transmission interval ($T_r$) is made a reference point (k=1), and a sampling point just before the end of the radar transmission interval ($T_r$), which is k=($N_r$+$N_u$)$N_s$/$N_o$, is made one period. That is, k=1, . . . , ($N_r$+$N_u$)$N_s$/$N_o$ is given.

The correlation calculator 209 performs, for each radar transmission interval $T_r$, a calculation for sliding correlation between each of the discrete samples values x(k, M) input from the A/D converters 207 and 208 and each of the pulse compression codes $a_n$ (n=1, . . . , L) having the code length L and transmitted by the radar transmitter 100. For example, a correlation calculation value AC(k, M) in the sliding correlation calculation at the discrete time point k in the Mth radar transmission interval $T_r[M]$ is calculated based on:

$$AC(k, M) = \sum_{n=1}^{L} x(k + N_s(n-1), M) a_n^* \quad (8)$$

where the asterisk indicates a complex conjugate operator.

By using expression (8), the correlation calculator 209 performs a correlation calculation, for example, during a period of k=1, . . . , ($N_r$+$N_u$)$N_s$/$N_o$.

The correlation calculator 209 performs not only the correlation calculation for k=1, . . . , ($N_r$+$N_u$)$N_s$/$N_o$, but also may limit the measurement range (i.e., the range of k) in accordance with the range in which a target to be measured by the radar device 10 exists. This allows the correlation calculator 209 to reduce the amount of calculation processing.

Figure 8:
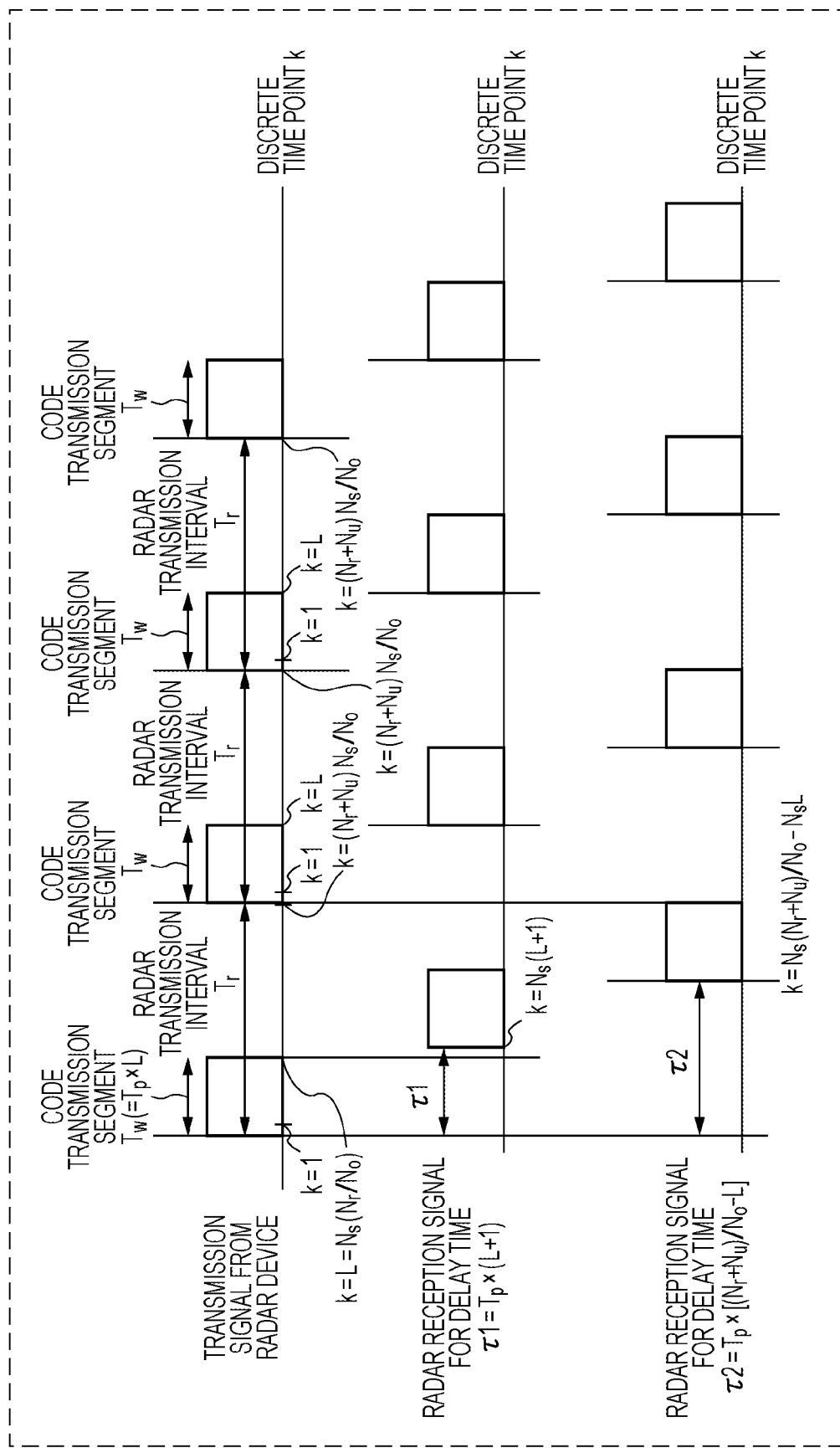
FIG. 8 is a diagram for describing a radar-transmission-signal timing and a measurement range.

Specifically, for example, the correlation calculator 209 may limit the measurement range to k=$N_s$(L+1), . . . , ($N_r$+$N_u$)$N_s$/$N_o$−$N_s$L. In FIG. 8, the radar device 10 does not perform measurement in the time segment corresponding to each code transmission segment Tw. FIG. 8 is a diagram for describing a radar-transmission-signal timing and a measurement range. Thus, for example, when a radar transmission signal leaks directly to the radar receiver 200, the correlation calculator 209 does not perform processing in the period (a period of at least τ1 or less) in which the radar transmission signal leaks, and thus the radar device 10 can perform measurement without being affected by the leak.

Also, when limiting the measurement range (the range of k), the radar device 10 may similarly apply the limiting of the measurement range (the range of k) to the processing performed by the adder 210, the doppler-frequency analyzer 211, and the position-determination result outputter 212. This can reduce the amount of processing in each configuration and can reduce the power consumption in the radar receiver 200.

The adder 210 performs a predetermined number of additions, $N_p$ times, of the each correlation calculation value AC(k, M), which is obtained for each radar transmission interval $T_r$ (i.e., for each discrete time point k) and output from the correlation calculator 209, as a unit of addition, as in:

$$CI(k, m) = \sum_{g=1}^{N_p} AC(k, N_p(m-1) + g) \quad (9)$$

In other words, the mth output CI(k, m) of the adder 210 for the discrete time point k is a value obtained by performing addition of AC(k, $N_p$(m−1)+1) to AC(k, $N_p$×m), each being a unit of addition, with the timing of the discrete time point k being aligned, where $N_p$ is an integer greater than or equal to 1, and m is an integer greater than 0.

The doppler-frequency analyzer 211 corrects a phase shift $\Phi(f_s)=2\pi f_s(Tr \times N_p)\Delta\Phi$ corresponding to $2N_f$ different Doppler frequencies $f_s\Delta\Phi$, and by using expression (10) below, the doppler-frequency analyzer 211 performs addition of CI(k, $N_c$(w−1)+1) to CI(k, $N_c$×w), which are obtained at the respective discrete time points k and are $N_c$ outputs of the adder 210, each being a unit of addition, with the timing of the discrete time points k being aligned.

$$\begin{aligned} FT\_CI(k, f_s, w) &= \sum_{q=0}^{N_c-1} CI(k, N_c(w-1) + q + 1)\exp[-j\phi(f_s)q] \\ &= \sum_{q=0}^{N_c-1} CI(k, N_c(w-1) + q + 1)\exp[-j2\pi f_s T_r N_p q\Delta\phi] \end{aligned} \quad (10)$$

In expression (10), FT_CI(k, $f_s$, w) is the wth output of the doppler-frequency analyzer 211 and is a Doppler-frequency analysis result of a reflection wave received at the discrete time point k. In the expression, $f_s$=−$N_f$+1, . . . , 0, . . . , $N_f$, k=1, . . . , ($N_r$+$N_u$)$N_s$/$N_o$, w is an integer greater than 0, $\Delta\Phi$ is a unit of phase rotation, and j is an imaginary unit.

As a result of the addition using expression (10), the doppler-frequency analyzer 211 can obtain FT_CI(k, −$N_f$+1, w), . . . , and FT_CI(k, $N_f$−1, w), which are addition results corresponding to $2N_f$ Doppler frequency components at each discrete time point k, for each period $(T_r \times N_p \times N_c)$ that is $N_p \times N_c$ times of the radar transmission interval $T_r$.

A case of $\Delta\Phi = 1/(T_r \times N_p \times N_c)$ and $N_f = N_c/2$ in expression (10) corresponds to a case in which the doppler-frequency analyzer 211 performs discrete Fourier transform processing on an output of the adder 210 by using a sampling interval $Td_s = (T_r \times N_p)$ and a sampling frequency $fd_s = 1/Td_s$, as in:

$$FT\_CI(k, f_s, w) = \sum_{q=0}^{N_c-1} CI(k, N_c(w-1) + q + 1)\exp\left[-j\frac{2\pi}{N_c}f_s q\right] \quad (11)$$

In addition, when $N_c$ is set to a power of 2, the doppler-frequency analyzer 211 can apply FFT processing and can reduce the amount of calculation processing.

The position-determination result outputter 212 converts each wth output of the doppler-frequency analyzer 211 into a power value $|FT\_CI(k, f_s, w)|^2$, and outputs a power value $|FT\_CI(k, f_s, w)|^2$ larger than or equal to a predetermined value and the index information of the power value larger than or equal to the predetermined value, the time point information k and the Doppler frequency $fs\Delta\Phi$. On the basis of the power value $|FT\_CI(k, f_s, w)|^2$ larger than or equal to the predetermined value and the index information of the power value larger than or equal to the predetermined value, the time point information k and the Doppler frequency $f_s\Delta\Phi$, the position-determination result outputter 212 outputs the following.

First, the position-determination result outputter 212 adds the Doppler frequency $f_{dm}$ determined by the doppler correction phase-rotation controller 500 to the Doppler frequency $f_s\Delta\Phi$ having the power value larger than or equal to the predetermined value to thereby calculate a corrected Doppler frequency $(f_s\Delta\Phi + f_{dm})$. Next, the position-determination result outputter 212 outputs the power value $|FT\_CI(k, f_s, w)|^2$ larger than or equal to the predetermined value, the time point information k that is index information of the power value larger than or equal to the predetermined value, and the corrected Doppler frequency $(f_s\Delta\Phi + f_{dm})$. This makes it possible to output the Doppler frequency of a target which is obtained by correcting Doppler frequency components due to the speed $V_c$ of the vehicle, which is a moving object on which the radar device 10 is mounted.

The position-determination result outputter 212 may output distance information by converting the time point information. In this case, the time point information k may be converted into distance information R(k), for example, by using:

$$R(k) = k\frac{T_w C_0}{2L} \quad (12)$$

where $T_w$ indicates a code transmission segment, L indicates a pulse code length, and $C_0$ indicates the speed of light.

The position-determination result outputter 212 may also output a relative speed component by converting the Doppler frequency. In such a case, the Doppler frequency $f_s\Delta\Phi$ may be converted into a relative speed component $v_d(f_s)$ by using:

$$v_d(f_s) = \frac{\lambda}{2}(f_s\Delta\phi + f_{dm}) \quad (13)$$

where $\lambda$ indicates the wavelength of the carrier frequency of a radar transmission wave output from the wireless transmitter 103.

As described above, the radar device 10 according to the first embodiment is mounted on a vehicle, which is a moving object, the doppler correction phase-rotation controller 500 of which calculates a Doppler correction phase-rotation amount for correcting Doppler frequencies due to movement of the vehicle on the basis of the vehicle speed Vc, and the phase rotator 102 of which corrects the Doppler frequency component $f_{dm}$ of a radar transmission signal for each radar transmission interval by using the Doppler correction phase-rotation amount. The Doppler frequency $f_{dm}$ due to movement of the vehicle increases, as the vehicle speed Vc increases.

The Doppler frequency range in which frequency aliasing does not occur in the doppler-frequency analyzer 211 is $\pm 1/(2fd_s)$, and when the position-determination result outputter 212 pre-corrects the Doppler frequency component $f_{dm}$ due to movement of the vehicle, the radar device 10 can detect Doppler frequencies in the range of $-1/(2fd_s) + f_{dm}$ to $+1/(2fd_s) + f_{dm}$ without occurrence of frequency aliasing. Thus, in the radar device 10, the detection range of Doppler frequencies can be changed according to an increase in the speed of the vehicle, thus making it possible to increase the detection range of Doppler frequencies. In addition, since the radar device 10 has one type of radar transmission interval, it is possible to suppress an increase in the transmission time.

Also, during the measurements in one measurement period, the radar device 10 according to the first embodiment continuously uses the Doppler correction phase-rotation amount determined by the doppler correction phase-rotation controller 500. That is, during the measurements in one measurement period, the Doppler correction phase-rotation amount for correcting Doppler frequencies due to movement of the moving object (vehicle) on which the radar device 10 is mounted is constant.

The phase rotator 102 may determine the Doppler correction phase-rotation amount, input from the doppler correction phase-rotation controller 500, for the radar transmission signal input from the LPF 107, on the basis of the number of additions, $N_p$, by using:

$$\exp[-j\{\phi_{dm}N_p(\text{ceil}(M/N_p)-1)\}]r(n,M) \quad (29)$$

where ceil(x) is a function for rounding an element x to a closest integer in a positive infinite direction. That is, the phase rotator 102 generates a signal obtained by giving phase rotation to the baseband radar transmission signal r(n, M) = I(n, M) + jQ(n, M), as in expression (29), and outputs the generated signal to the wireless transmitter 103.

As a result of the giving such a Doppler correction phase-rotation amount, the Doppler correction phase-rotation amount in the transmission intervals for which the adder 210 in the radar receiver 200 performs the additions have a constant value. Accordingly, when the code generator 105 uses a complementary code sequence (including, for example, a Golay code sequence or Spano code sequence), the Doppler correction phase-rotation amount becomes constant in the transmission intervals for which the adder 210 performs the additions, thus providing an advantage of suppressing an increase in the sidelobe level in the distance direction.

Figure 4B:
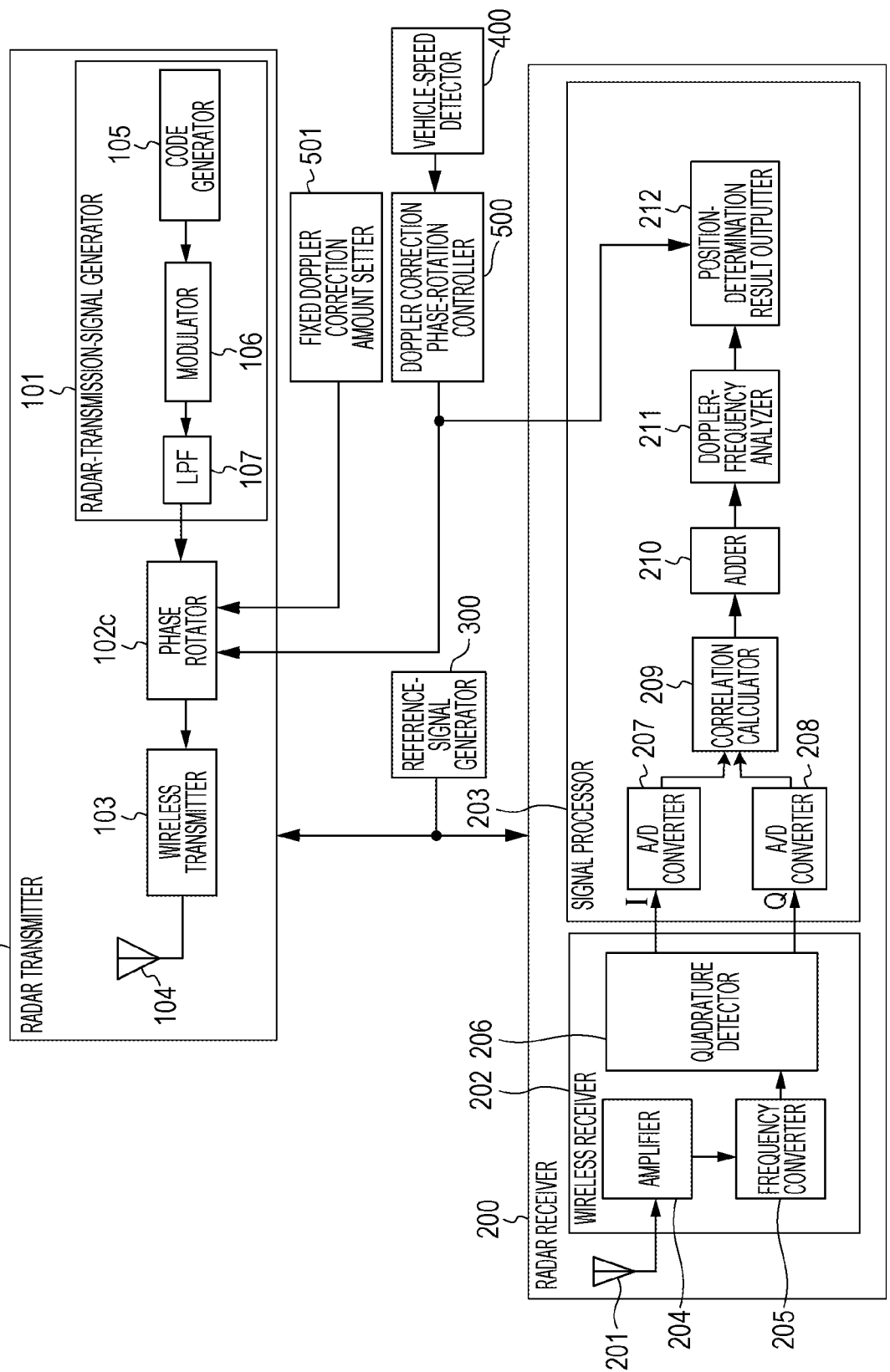
FIG. 4B is a block diagram illustrating another example of the configuration of the radar device according to the first embodiment.

When it is already known that the distribution of Doppler frequencies of a group of targets to be observed has an imbalance in a positive or negative direction, a phase rotator 102c may pre-give a Doppler correction amount for correcting the imbalance in the distribution of the Doppler frequencies of the group of targets by using the configuration illustrated in FIG. 4B. FIG. 4B is a block diagram illustrating another example of the configuration of the radar device. Operations of portions different from those in FIG. 4A will be described below.

In FIG. 4B, when it is already known that the distribution of Doppler frequencies of a group of targets to be observed has an imbalance in a positive or negative direction, a fixed doppler correction amount setter 501 pre-gives a fixed Doppler correction amount for correcting the imbalance in the distribution of the Doppler frequencies of the group of targets to the phase rotator 102c in a radar transmitter 100d.

More specifically, when the distribution of the Doppler frequencies of a group of targets to be observed is unbalanced in the positive direction, the phase rotator 102c gives, to the radar transmission signal, a Doppler correction phase-rotation amount $\phi_{dm}$ to which a fixed Doppler correction amount $f_{d0}$, which is a fixed negative value represented by expression (30) below, is further added, regardless of the Doppler frequency $f_{dm}$ due to movement of the vehicle. Thus, the radar receiver 200 can perform Doppler correction corresponding to the Doppler frequency distribution of a group of targets to be observed and can increase the Doppler frequency range of detectable targets.

$$\phi_{dm} = 2\pi(f_{dm} + f_{d0})T_r, f_{d0} < 0 \tag{30}$$

Similarly, when the distribution of the Doppler frequencies of a group of targets to be observed is unbalanced in the negative direction, the phase rotator 102c gives, to the radar transmission signal, a Doppler correction phase-rotation amount $\phi_{dm}$ to which a fixed Doppler correction amount $f_{d0}$, which is a fixed positive value represented by expression (31) below, is further added, regardless of the Doppler frequency $f_{dm}$ due to movement of the vehicle. Thus, the radar receiver 200 can perform Doppler correction corresponding to the Doppler frequency distribution of a group of targets to be observed and can increase the Doppler frequency range of detectable targets.

$$\phi_{dm} = 2\pi(f_{dm} + f_{d0})T_r, f_{d0} > 0 \tag{31}$$

The fixed doppler correction amount setter 501 may be included in any of the configurations in the embodiments below, and such a configuration can also obtain a similar advantage.

Second Embodiment

As described above, in the radar device 10 according to the first embodiment, the phase rotator 102 included in the radar transmitter 100 performs Doppler-frequency component correction according to the speed of the vehicle, which is a moving object, on the radar transmission signal, when the radar transmission signal is transmitted. In a second embodiment of the present disclosure, a description will be given of a configuration in which a radar receiver includes a phase rotator and performs Doppler-frequency component correction according to the speed of a vehicle, which is a moving object, on a received reflection wave signal.

FIG. 9A is a block diagram illustrating the configuration of a radar device 10a according to the second embodiment. In FIG. 9A, the radar device 10a includes a radar transmitter 100a, a radar receiver 200a, a reference-signal generator 300, a vehicle-speed detector 400, and a doppler correction phase-rotation controller 500a, as in the first embodiment. The radar device 10a is mounted on a vehicle (not illustrated), which is one example of a moving object.

The radar transmitter 100a according to the second embodiment has a configuration in which the phase rotator 102 is eliminated from the radar transmitter 100 described above in the first embodiment. Since other constituent elements are substantially the same as those in the first embodiment, descriptions thereof are not given hereinafter.

Similarly, since the reference-signal generator 300, the vehicle-speed detector 400, and the doppler correction phase-rotation controller 500a are substantially the same as those in the first embodiment, descriptions thereof are not given hereinafter.

The radar receiver 200a according to the second embodiment differs from the radar receiver 200 according to the first embodiment in that a signal processor 203a includes a phase rotator 213. An adder 210a and a doppler-frequency analyzer 211a differ from those in the first embodiment in that a signal to be processed is an output signal of the phase rotator 213.

The phase rotator 213 gives a Doppler correction phase-rotation amount $\phi_{dm}$, input from the doppler correction phase-rotation controller 500a, to a correlation calculation value output from the correlation calculator 209. That is, the phase rotator 213 generates a signal obtained by giving phase rotation in expression (14) below to an output AC(k, M) of the correlation calculator 209 and outputs the generated signal to the adder 210a.

$$\exp[-j\{\phi_{dm}(M-1)\}]AC(n,M) \tag{14}$$

In this case, similarly to the correlation calculator 209, the phase rotator 213 performs a calculation in expression (14) in a period of k=1, ..., $(N_r+N_u)N_s/N_o$.

On the basis of an output of the phase rotator 213 for each discrete time point k, the adder 210a performs a predetermined number of additions, $N_p$, for a period $(T_r \times N_p)$ that is $N_p$ times of the radar transmission interval $T_r$, as in:

$$CI(k, m) = \sum_{g=1}^{N_p} \exp[-j\{\phi_{dm}(N_p(m-1) + g - 1)\}]AC(k, N_p(m-1) + g) \tag{15}$$

In other words, the mth output CI(k, m) of the adder 210a for the discrete time point k is a value obtained by performing addition of AC(k, $N_p$(m−1)+1) to AC(k, $N_p \times$m), each of which being a unit of addition, with the timing of the discrete time point k being aligned, where $N_p$ is an integer greater than or equal to 1, and m is an integer greater than 0.

The doppler-frequency analyzer 211a corrects a phase shift $\Phi(f_s) = 2\pi f_s(T_r \times N_p)\Delta\Phi$ corresponding to $2N_f$ different Doppler frequencies $f_s\Delta\Phi$, and by using expression (16) below, the doppler-frequency analyzer 211a performs addition of CI(k, $N_c$(w−1)+1) to CI(k, $N_c \times$w), which are obtained at the respective discrete time points k and are $N_c$ outputs of the adder 210a, are each a unit of addition, with the timing of the discrete time points k being aligned.

$$FT\_CI(k, f_s, w) = \sum_{q=0}^{N_c-1} CI(k, N_c(w-1) + q + 1)\exp[-j\phi(f_s)q] \tag{16}$$

$$= \sum_{q=0}^{N_c-1} CI(k, N_c(w-1) + q + 1)\exp[-j2\pi f_s T_r N_p q \Delta\phi]$$

where $f_s = -N_f + 1, ..., 0, ..., N_f$, k=1, ..., $(N_r+N_u)N_s/N_o$, w is a natural number, $\Delta\Phi$ represents a unit of phase rotation, and j is an imaginary unit. In expression (16), FT_CI(k, $f_s$, w) is the wth output of the doppler-frequency analyzer 211a and is a Doppler-frequency analysis result of a reflection wave received at the discrete time point k.

As a result of the addition using expression (16), the doppler-frequency analyzer 211a can obtain FT_CI(k, $-N_f$+1, w), ..., and FT_CI(k, $N_f$-1, w), which are addition results corresponding to $2N_f$ Doppler frequency components at each discrete time point k, for each period ($T_r \times N_p \times N_c$) that is obtained by repeating the radar transmission interval $T_r$ $N_p \times N_c$ times.

As described above, in the radar device 10a according to the second embodiment, the phase rotator 213 corrects the Doppler frequency component $f_{dm}$ included in the reflection wave signal due to movement of the vehicle. The Doppler frequency $f_{dm}$ due to movement of the vehicle increases, as the speed of the vehicle increases.

The Doppler frequency range in which frequency aliasing does not occur in the doppler-frequency analyzer 211a is $\pm 1/(2fd_s)$, and when the phase rotator 213 at a stage prior to the doppler-frequency analyzer 211a pre-corrects the Doppler frequency component $f_{dm}$ due to movement of the vehicle, the radar device 10a can detect Doppler frequencies in the range of $-1/(2fd_s)+f_{dm}$ to $+1/(2fd_s)+f_{dm}$ without occurrence of frequency aliasing. Thus, in the radar device 10a, the detection range of Doppler frequencies can be changed according to an increase in the speed of the vehicle, thus making it possible to increase the detection range of Doppler frequencies. In addition, since the radar device 10a has one type of radar transmission interval, it is possible to suppress an increase in the transmission time.

Also, the radar device 10a according to the second embodiment continuously uses, in one measurement period, the Doppler correction phase-rotation amount determined by the doppler correction phase-rotation controller 500a in the initial radar transmission interval in the measurement period. That is, the Doppler correction phase-rotation amount for correcting Doppler frequencies due to movement of the moving object (the vehicle) on which the radar device 10a is mounted is constant during one measurement period.

Figure 9B:
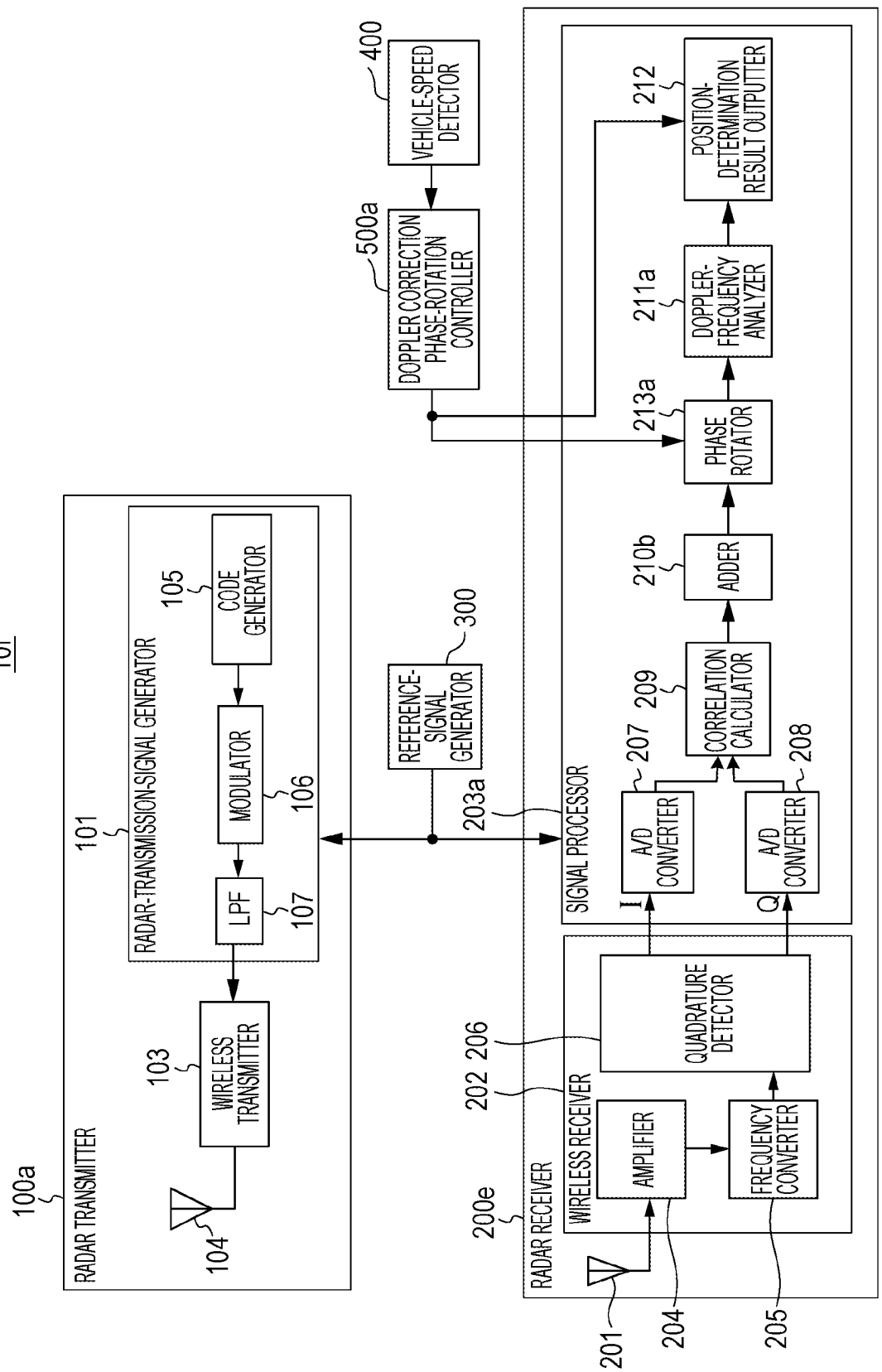
FIG. 9B is a block diagram illustrating another example of the configuration of the radar device according to the second embodiment.

Although the configuration in which the phase rotator 213 performs processing on outputs of the correlation calculator 209 has been described in the present embodiment, the present disclosure is not limited thereto, and the configuration illustrated in FIG. 9B can also obtain a similar advantage. FIG. 9B is a block diagram illustrating another example of the configuration of the radar device.

In FIG. 9B, a phase rotator 213a is arranged at a stage subsequent to an adder 210b, which differs from the configuration illustrated in FIG. 9A. In the following, a description will be given of operations of constituent elements in FIG. 9B that differ from those in FIG. 9A.

The adder 210b performs an operation that is analogous to the operation described in the first embodiment. That is, the adder 210b performs a predetermined number of additions, $N_p$, in which the correlation calculation value AC(k, M) obtained for each radar transmission interval $T_r$ (i.e., for each discrete time point k) and output from the correlation calculator 209 is a unit of addition, as in expression (9) noted above.

In other words, the mth output CI(k, m) of the adder 210b for the discrete time point k is a value obtained by performing addition in which AC(k, $N_p(m-1)+1$) to AC(k, $N_p \times m$) are used as a unit of addition, with the timing of the discrete time point k being aligned, where $N_p$ is an integer greater than or equal to 1, and m is an integer greater than 0.

Considering a period corresponding to the number of additions, $N_p$, in the adder 210b, the phase rotator 213a gives a correction phase-rotation amount $\phi_{dm} N_p$, obtained by multiplying the Doppler correction phase-rotation amount $\phi_m$ input from the doppler correction phase-rotation controller 500a by $N_p$, to the mth output CI(k, m) of the adder 210b for the discrete time point k.

That is, the phase rotator 213a generates a signal obtained by giving phase rotation in expression (32-1) below to an output CI(k, m) of the adder 210b and outputs the generated signal to a doppler-frequency analyzer 211b.

$$\exp[-j\{\phi_{dm} N_p(m-1)\}] CI(k, m) \quad (32\text{-}1)$$

In this case, similarly to the correlation calculator 209, the phase rotator 213a performs calculation in expression (32) in a period of k=1, ..., $(N_r + N_u) N_s / N_o$.

The doppler-frequency analyzer 211b corrects a phase shift $\Phi(f_s) = 2\pi f_s (T_r \times N_p) \Delta\Phi$ corresponding to $2N_f$ different Doppler frequencies $f_s \Delta\Phi$ and by using expression (33) below, doppler-frequency analyzer 211b performs addition in which expression (32-2) to expression (32-3), which are obtained for respective discrete time points k and are $N_c$ outputs of the phase rotator 213a, are used as a unit of addition, with the timing of the discrete time points k being aligned.

$$\exp[-j\{\phi_{dm} N_p(N_c(w-1))\}] \times CI(k, N_c(w-1)+1) \quad (32\text{-}2)$$

$$\exp[-j\{\phi_{dm} N_p(N_c w-1)\}] \times CI(k, N_c \times w) \quad (32\text{-}3)$$

$$\begin{aligned}
\text{FT\_CI}(k, f_s, w) &= \sum_{q=0}^{N_c-1} \exp[-j\{\phi_{dm} N_p(N_c(w-1)+q+1)\}] \\
&\quad CI(k, N_c(w-1)+q+1) \exp[-j\phi(f_s)q] \\
&= \sum_{q=0}^{N_c-1} \exp[-j\{\phi_{dm} N_p(N_c(w-1)+q+1)\}] \\
&\quad CI(k, N_c(w-1)+q+1) \exp[-j2\pi f_s T_r N_p q \Delta\phi]
\end{aligned} \quad (33)$$

By giving a Doppler correction phase-rotation amount as described above, it is possible to obtain an advantage that is analogous to that in the first embodiment. In addition, in this configuration, the Doppler correction phase-rotation amounts in the transmission intervals for which the adder 210b in a radar receiver 200e performs the additions have a constant value. Accordingly, when the code generator 105 uses complementary code sequences (including, for example, Golay code sequences or Spano code sequences), the Doppler correction phase-rotation amounts in the transmission intervals for which the adder 210b performs the additions have a constant value, thus providing an advantage of suppressing an increase in the sidelobe level in the distance direction.

Third Embodiment

A radar device in a third embodiment of the present disclosure has a constituent element for controlling the main beam direction of radar transmission waves in addition to the configuration in the first embodiment described above.

Figure 10:
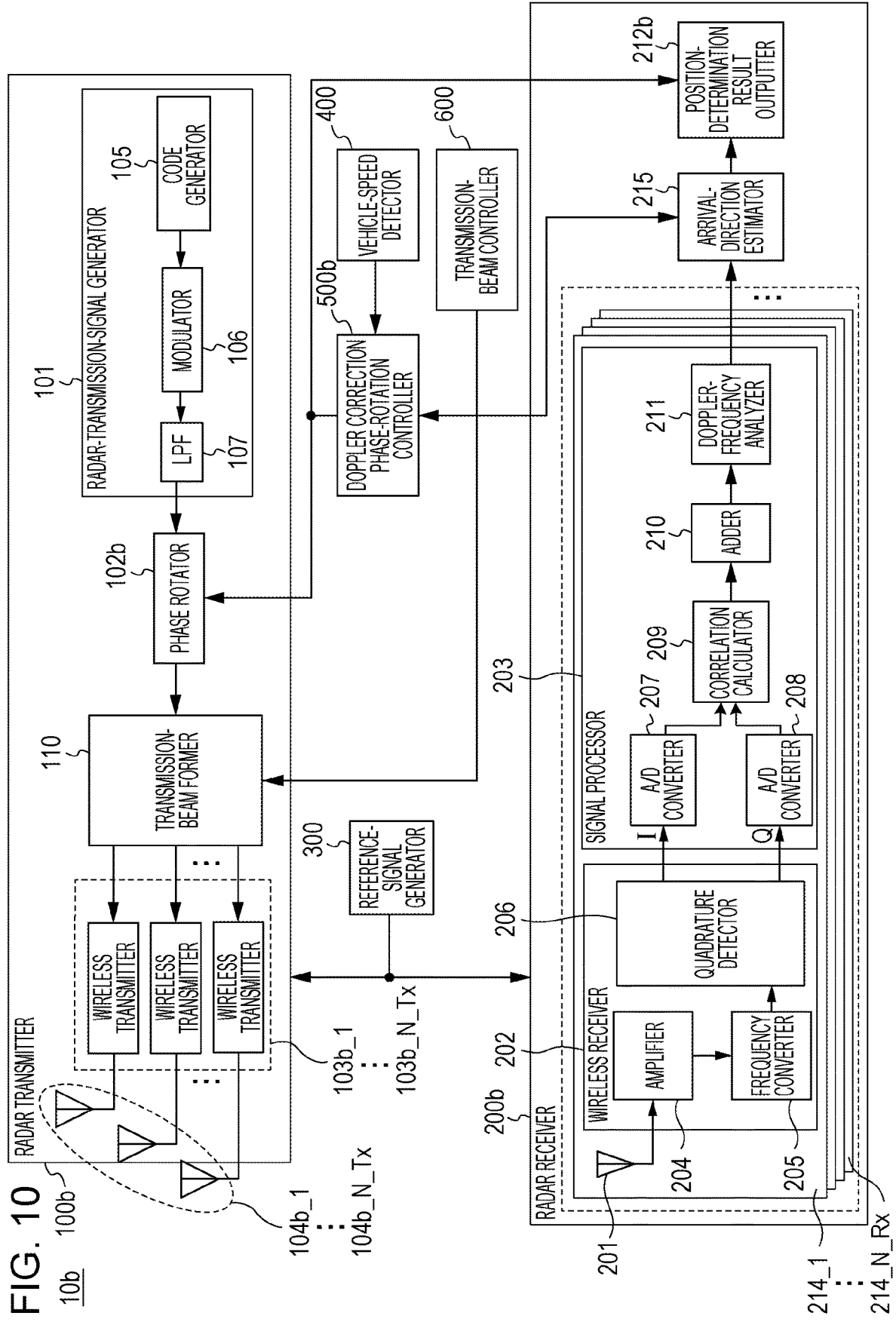
FIG. 10 is a block diagram illustrating the configuration of a radar device according to a third embodiment.

FIG. 10 is a block diagram illustrating the configuration of a radar device 10b according to the third embodiment. In FIG. 10, the radar device 10b includes a radar transmitter 100b, a radar receiver 200b, a reference-signal generator 300, a vehicle-speed detector 400, a doppler correction phase-rotation controller 500b, and a transmission-beam controller 600. The radar device 10b is mounted on a vehicle (not illustrated), which is one example of a moving object. In FIG. 10 and the description below, constituent elements that are substantially the same as those in the first embodiment are denoted by the same reference numerals, and descriptions thereof are not given hereinafter.

Figure 11:
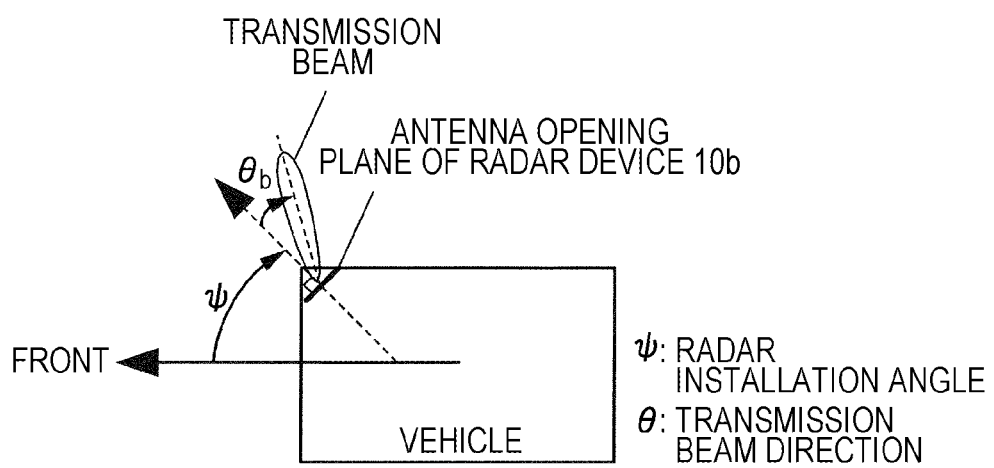
FIG. 11 is a top view illustrating relationships of a vehicle, which is a moving object, a radar installation angle, and a radar transmission beam direction.

First, a description will be given of the transmission-beam controller 600. The transmission-beam controller 600 determines a main beam direction $\theta_b$ of a radar transmission beam and instructs the radar transmitter 100b to transmit a radar transmission beam in the determined main beam direction. FIG. 11 is a top view illustrating relationships of a vehicle, which is a moving object, a radar installation angle, and a radar transmission beam direction. In the present embodiment, as illustrated in FIG. 11, the angle of a radar transmission beam relative to a direction orthogonal to the antenna opening plane of the radar device 10b is defined as the main beam direction $\theta_b$.

Specifically, for example, the transmission-beam controller 600 switches the main beam direction in a pre-set beam variable range $\theta_{min} \leq \theta_b \leq \theta_{max}$ at predetermined intervals $\Delta\Phi$. The transmission-beam controller 600 switches the main beam direction $\theta_b$ at every $N_f (=N_c \times N_p)$ radar transmission intervals $T_r$.

The doppler correction phase-rotation controller 500b determines a Doppler correction phase-rotation amount for pre-correcting Doppler components due to movement of the vehicle, on the basis of the main beam direction $\theta_b$ determined by the transmission-beam controller 600 in addition to information of the vehicle speed $V_c$ output by the vehicle-speed detector 400. In this case, when a radar installation angle $\psi$ is considered, the Doppler frequency $f_{dm}$ due to movement of the vehicle in the main beam direction $\theta_{13}$ can be given by:

$$f_{dm} = \frac{2V_c\cos(\psi + \theta_b)}{\lambda} \qquad (17)$$

where $\lambda$ indicates the wavelength of the carrier frequency of the radar transmission wave.

On the basis of the Doppler frequency $f_{dm}$ due to movement of the vehicle and the radar transmission interval $T_r$, the doppler correction phase-rotation controller 500b determines the Doppler correction phase-rotation amount $\phi_{dm}$ for pre-correcting Doppler components due to movement of the vehicle, by using:

$$\phi_{dm} = 2\pi f_{dm} T_r \qquad (18)$$

Rather than calculating the Doppler correction phase-rotation amount for each radar transmission interval $T_r$, the doppler correction phase-rotation controller 500b may pre-tabularize Doppler correction phase-rotation amounts $\phi_{dm}$ for respective values of Doppler frequencies $f_{dm}$ and radar transmission intervals $T_r$ and may refer to the table during determination of the Doppler correction phase-rotation amount $\phi_{dm}$ to select the Doppler correction phase-rotation amount $\phi_{dm}$ that is the closest to the Doppler frequency $f_{dm}$ and the radar transmission interval $T_r$. The doppler correction phase-rotation controller 500b determines the Doppler correction phase-rotation amount $\phi_{dm}$, each time the measurement is performed. The Doppler correction phase-rotation amount $\phi_{dm}$ makes the Doppler frequency constant in one measurement period.

[Description of Radar Transmitter 100b]

Next, a description will be given of the radar transmitter 100b. The radar transmitter 100b in FIG. 10 differs from the radar transmitter 100 in the radar device 10 in the first embodiment in that the radar transmitter 100b includes a phase rotator 102b, a plurality of, for example, N_Tx, wireless transmitters 103b_1 to 103b_N_Tx, N_Tx transmission antennas 104b_1 to 104b_N_Tx, and a transmission-beam former 110 (N_Tx is an integer greater than or equal to 2).

The phase rotator 102b gives, for each radar transmission interval $T_r$, the Doppler correction phase-rotation amount $\phi_{dm}$, output from the doppler correction phase-rotation controller 500b, to a baseband radar transmission signal r(n, M)=I(n, M)+jQ(n, M) output from a LPF 107, as in:

$$\exp[-j\{\phi_{dm}(M-1)\}]r(n,M) \qquad (19)$$

In order for each of the N_Tx wireless transmitters 103b_1 to 103b_N_Tx to transmit a radar transmission beam in the main beam direction $\theta_b$ determined by the transmission-beam controller 600, the transmission-beam former 110 applies weighting to the baseband radar transmission signal output from the phase rotator 102b. For example, the transmission-beam former 110 applies the weighting by multiplying the baseband radar transmission signal by a weighting factor WTx(Index_Tx, $\theta_b$). Index_Tx is a parameter indicating one of the N_Tx wireless transmitters. In the following description, the nth transmission beam direction is represented by $\theta_n$.

In this case, when the transmission antennas 104b_1 to 104b_N_Tx are arranged at intervals d in a straight line, the weighting factor WTx(Index_Tx, $\theta_b$) can be calculated using:

$$WTx(\text{Index\_Tx}, \theta_b) = \begin{bmatrix} 1 \\ \exp(j2\pi d\sin\theta_b/\lambda) \\ \vdots \\ \exp[j2\pi(\text{N\_Tx}-1)d\sin\theta_b/\lambda] \end{bmatrix} \qquad (20)$$

where Index_Tx=1, ..., N_Tx, and $\lambda$ is the wavelength of the carrier frequency of the radar transmission wave. The transmission-beam former 110 may give, to a radar transmission signal, a weighting factor based on the phase components and amplitude components of the radar transmission signal. In the case, it is possible to reduce the sidelobe level of the radar transmission waves.

The (Index_Tx)th wireless transmitter 103b_Index_Tx performs frequency conversion on the radar transmission signal, weighted with the weighting factor WTx(Index_Tx, $\theta_b$) and output from the transmission-beam former 110, to obtain a radar transmission signal in a carrier frequency (a radio frequency (RF)) band, amplifies the obtained radar transmission signal into a radar transmission signal with a predetermined transmission power P [dB] by using an amplifier, and outputs the amplified radar transmission signal. All of the first to (N_Tx)th wireless transmitter 103b_1 to 103b_N_Tx perform similar processing.

The (Index_Tx)th transmission antenna radiates an output of the (Index_Tx)th wireless transmitter in the direction determined by the transmission-beam controller 600. Similarly to the wireless transmitters 103b_1 to 103b_N_Tx, all of the first to (N_Tx)th transmission antennas 104b_1 to 104_N_Tx perform similar processing.

[Description of Radar Receiver 200b]

The radar receiver 200b includes a plurality of reception antenna systems 214_1 to 214_N_Rx, an arrival-direction estimator 215, and a position-determination result outputter 212b. Each reception antenna system 214 includes a reception antenna 201, a wireless receiver 202 (including an amplifier 204, a frequency converter 205, and a quadrature detector 206), and a signal processor 203 (including A/D converters 207 and 208, a correlation calculator 209, an adder 210, and a doppler-frequency analyzer 211). Since operations of these constituent elements are the same as or similar to those in the first embodiment, descriptions thereof are not given hereinafter.

In order to detect inter-antenna phase differences of reflection waves from a target, the arrival-direction estimator 215 calculates a correlation vector Hp(k, $f_s$, w) for each discrete time point k and for each Doppler frequency $f_s$ on the basis of outputs $FT\_CI^1$(k, $f_s$, w), ..., and $FT\_CI^{N\_Rx}$(k, $f_s$, w) from the doppler-frequency analyzers 211 in the reception antenna systems 214_1 to 214_N_Rx and by using:

$$H_p(k, fs, w) = \begin{bmatrix} FT\_CI^1(k, fs, w) \\ FT\_CI^2(k, fs, w) \\ \vdots \\ FT\_CI^{N\_Rx}(k, fs, w) \end{bmatrix} \quad (21)$$

On the basis of the transmission beam direction $\theta_b$ reported from the transmission-beam controller 600 and a range BW corresponding to approximately the transmission beam width, the arrival-direction estimator 215 limits an estimation range for estimating the arrival direction of a transmission beam. When a beam former method, which estimates the arrival direction by scanning the main beam of the array antenna, is used, the arrival-direction estimator 215 estimates the arrival direction of the transmission beam by performing, for each discrete time point k and for each Doppler frequency $f_s$, a calculation for correlation between the correlation vector Hp(k, $f_s$, w) and a direction vector in the range BW.

Now, a direction vector $D(\theta_u)$ is defined. The direction vector $D(\theta_u)$ is a value storing a complex response of the array antenna for each arrival azimuth θ. In this case, u=1, ..., NU, where NU represents the number of angles of a stored direction vector. Complex responses of the array antenna may be pre-measured in a radio-wave dark room or the like and include inter-antenna deviation information, such as coupling between each of antenna elements in an array and the amplitude/phase error between each of the antenna elements, in addition to phase difference information geometric-technically calculated based on the element spacing between each of the antennas.

A direction vector $D(\theta_{select})$, which is included in an estimation range RangeDOA(θ), is calculated using:

$$P[D(\theta_{select}), k, fs, w] = |D(\theta_{select})^H H_p(k, fs, w)|^2 \quad (22)$$

The estimation range RangeDOA(θ) is a range that is pre-determined as an estimation range in which the arrival-direction is to be estimated, on the basis of a transmission beam direction θ(q) reported from the transmission-beam controller 600 and the range BW and by using:

$$\theta - BW/2 \le RangeDOA(\theta) \le \theta + BW/2 \quad (23)$$

The arrival-direction estimator 215 calculates an evaluation function value P(D(θ), k, $f_s$, w) for each transmission beam, for each discrete time point k, and for each Doppler frequency fs and outputs a direction in which the maximum value thereof is obtained to the position-determination result outputter 212b as an estimated arrival-direction value DOA (k, $f_s$, w). In conjunction with the estimated arrival-direction value DOA(k, $f_s$, w) with which the maximum value is obtained, the arrival-direction estimator 215 also outputs the time point k and the Doppler frequency $f_s\Delta\Phi$, which are index information of the estimated arrival-direction value DOA(k, $f_s$, w), to the position-determination result outputter 212b.

A known scheme such as Capon or multiple signal classification (MUSIC), other than a beam former method may also be used as the arrival-direction estimation method for the arrival-direction estimator 215.

On the basis of the estimated arrival-direction value DOA(k, $f_s$, w) for each transmission beam input from the arrival-direction estimator 215 and the time point information k and the Doppler frequency $f_s\Delta\Phi$, which are index information of the estimated arrival-direction value DOA(k, $f_s$, w), the position-determination result outputter 212b performs output described below.

Specifically, first, the position-determination result outputter 212b adds the Doppler frequency $f_{dm}$ determined by the doppler correction phase-rotation controller 500b to the Doppler frequency $f_s\Delta\Phi$, which is the index information of the estimated arrival-direction value DOA(k, $f_s$, w), to obtain a frequency $f_s\Delta\Phi + f_{dm}$ as a corrected Doppler frequency. Next, the position-determination result outputter 212b outputs the estimated arrival-direction value DOA(k, $f_s$, w) for each transmission beam, the time point k, which is the index information of DOA(k, $f_s$, w), and the corrected Doppler frequency ($f_s\Delta\Phi + f_{dm}$). The position-determination result outputter 212b may also output distance information obtained by converting the time point information.

The Doppler frequency $f_s\Delta\Phi$ may be output after being converted into a relative speed component between a target and the radar device. In such a case, the Doppler frequency $f_s\Delta\Phi$ may be converted into a relative speed component $v_d(f_s)$ by using:

$$v_d(f_s) = \frac{\lambda}{2}(f_s\Delta\phi + f_{dm}) \quad (24)$$

where λ indicates the wavelength of the carrier frequency of the radar transmission wave output from each wireless transmitter.

In addition, when the detection in the detection range is continuously performed, the transmission beam scanning is sequentially resumed from the beginning. Alternatively, the transmission beam scanning may be sequentially performed in an opposite direction from the last direction of the previous transmission beam scanning.

As described above, the radar device 10b according to the third embodiment includes the plurality of wireless transmitters 103b and the plurality of transmission antennas 104b, and the transmission-beam controller 600 varies the directions of transmission beams transmitted from the respective transmission antennas 104b to directions in corresponding predetermined ranges and transmits the transmission beams in the plurality of directions. The reception antenna systems 214 then receive reflection waves from the plurality of directions, and the arrival-direction estimator 215 estimates the arrival directions of the reflection waves received by the respective reception antenna systems 214. By estimating the direction in which the maximum value of the evaluation function value P(D(θ), k, $f_s$, w) based on the correlation vector Hp(k, $f_s$, w), which indicates a correlation for the arrival direction for each reflection wave, is obtained, it is possible to improve the detection accuracy of Doppler frequencies.

Since the radar transmission signals are transmitted in the transmission beam range determined by the transmission-beam controller 600, as described above, the radar detection range can be further increased, the accuracy of correcting Doppler frequencies due to movement of the moving object can be improved, and the maximum-speed detection range can be increased, in addition to the advantages obtained in the first and second embodiments.

Fourth Embodiment

As described above, in the radar device 10b according to the third embodiment, the phase rotator 102b included in the radar transmitter 100b pre-performs Doppler-frequency component correction according to the speed of a vehicle, which is a moving object, on the radar transmission signal. In a fourth embodiment of the present disclosure, a description will be given of a configuration in which a radar receiver includes phase rotators and Doppler-frequency component correction according to the speed of a vehicle, which is a moving object, is performed on received reflection wave signals.

Figure 12:
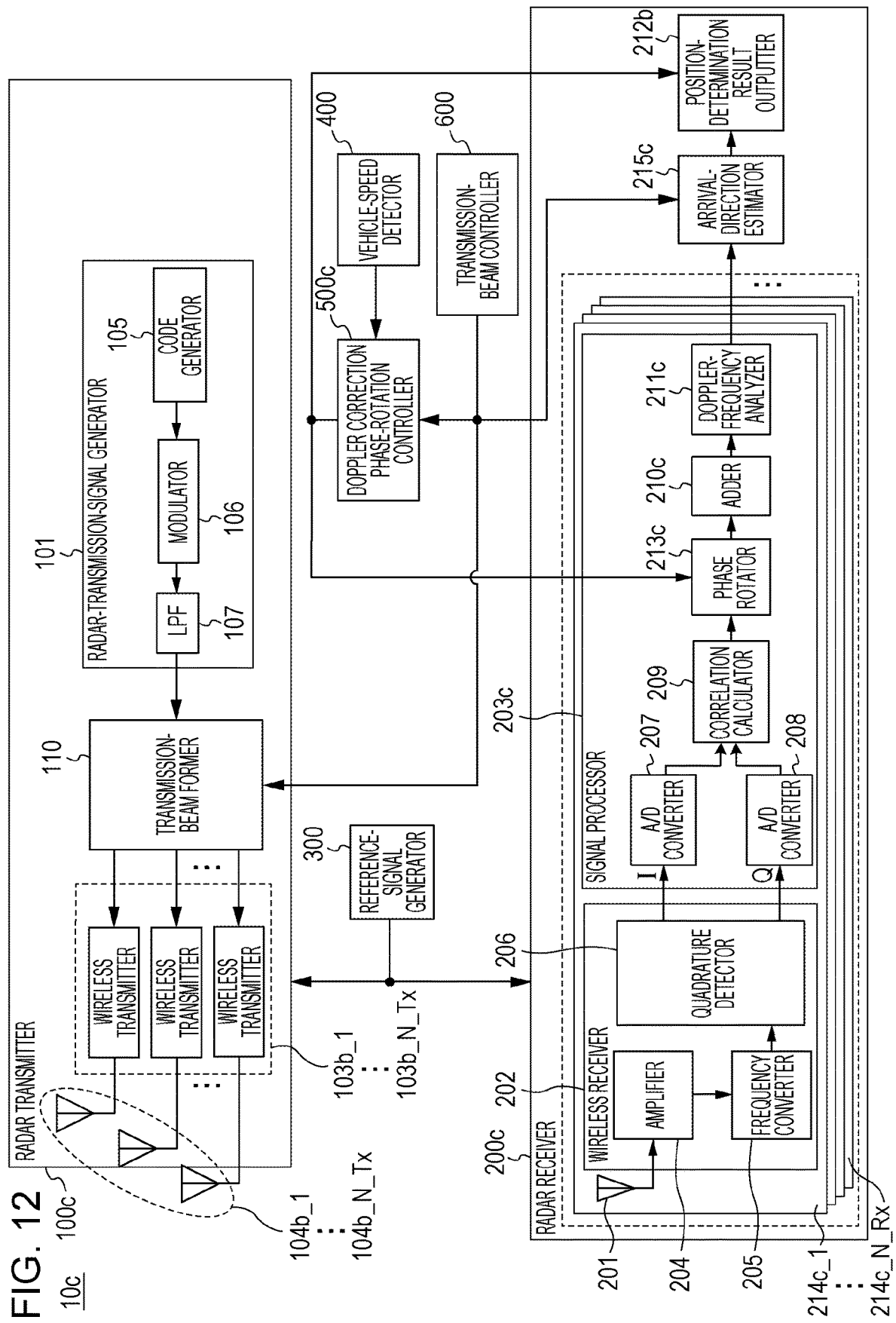
FIG. 12 is a block diagram illustrating the configuration of a radar device according to a fourth embodiment.

FIG. 12 is a block diagram illustrating the configuration of a radar device 10c according to the fourth embodiment. As illustrated in FIG. 12, the radar device 10c includes a radar transmitter 100c, a radar receiver 200c, a reference-signal generator 300, a vehicle-speed detector 400, and a doppler correction phase-rotation controller 500c, as in the third embodiment. The radar device 10c is assumed to be mounted on a vehicle (not illustrated), which is one example of a moving object.

The radar transmitter 100c according to the fourth embodiment has a configuration in which the phase rotator 102b is eliminated from the radar transmitter 100b described above in the third embodiment. Since other constituent elements are substantially the same as those in the third embodiment, descriptions thereof are not given hereinafter.

Similarly, since the reference-signal generator 300, the vehicle-speed detector 400, and the doppler correction phase-rotation controller 500c are also substantially the same as those in the third embodiment, descriptions thereof are not given hereinafter.

The radar receiver 200c according to the fourth embodiment differs from radar receiver 200b according to the third embodiment in that reception antenna systems 214c_1 to 214c_N_Rx include phase rotators 213c, respectively. Adders 210c and doppler-frequency analyzers 211c in signal processors 203c and an arrival-direction estimator 215c differ from those in the third embodiment in that signals to be processed are output signals of the phase rotator 213c.

Each phase rotator 213c gives a Doppler correction phase-rotation amount $\phi_{dm}$, output from the doppler correction phase-rotation controller 500c, to the correlation calculation value output from the corresponding correlation calculator 209. That is, each phase rotator 213c generates a signal obtained by giving phase rotation in expression (25) below to the output AC(k, M) of the correlation calculator 209 and outputs the generated signal to the corresponding adder 210c.

$$\exp[-j\{\phi_{dm}(M-1)\}]AC(n,M) \qquad (25)$$

In this case, similarly to the correlation calculator 209, each phase rotator 213c performs calculation in expression (25) for a period of k=1, . . . , $(N_r+N_u)N_s/N_o$.

On the basis of an output of each phase rotator 213c for each discrete time point k, the corresponding adder 210c performs a predetermined number of additions, $N_p$, for a period $(T_r \times N_p)$ that is $N_p$ times of the radar transmission interval $T_r$, as in:

$$CI(k, m) = \sum_{g=1}^{N_p} \exp[-j\{\phi_{dm}(N_p(m-1)+g-1)\}]AC(k, N_p(m-1)+g) \qquad (26)$$

In other words, the mth output CI(k, m) of the adder 210c for the discrete time point k is a value obtained by performing addition in which AC(k, $N_p(m-1)+1$) to AC(k, $N_p \times m$) are used as a unit of addition, with the timing of the discrete time point k being aligned, where $N_p$ is an integer greater than or equal to 1, and m is a natural number.

The doppler-frequency analyzer 211c corrects a phase shift $\Phi(f_s)=2\pi f_s(Tr \times N_p)\Delta\Phi$ corresponding to $2N_f$ different Doppler frequencies $f_s\Delta\Phi$, and by using expression (27) below, the doppler-frequency analyzer 211c performs addition in which CI(k, $N_c(w-1)+1$) to CI(k, $N_c \times w$), which are obtained at the respective discrete time points k and are $N_c$ outputs of the adder 210c, are used as a unit of addition, with the timing of the discrete time points k being aligned.

$$\begin{aligned}
FT\_CI(k, f_s, w) &= \sum_{q=0}^{N_c-1} CI(k, N_c(w-1)+q+1)\exp[-j\phi(f_s)q] \\
&= \sum_{q=0}^{N_c-1} CI(k, N_c(w-1)+q+1)\exp[-j2\pi f_s T_r N_p q\Delta\phi]
\end{aligned} \qquad (27)$$

where $f_s=-N_f+1, \ldots, 0, \ldots, N_f$, k=1, . . . , $(N_r+N_u)N_s/N_o$, w is a natural number, $\Delta\Phi$ represents a unit of phase rotation, and j is an imaginary unit. In expression (27), FT_CI(k, $f_s$, w) indicates the wth output of each doppler-frequency analyzer 211c and is an analysis result of a Doppler-frequency of a reflection wave received at a discrete time point k.

As a result of the addition using expression (27), each doppler-frequency analyzer 211c can obtain FT_CI(k, $-N_f+1$, w), . . . , and FT_CI(k, $N_f-1$, w), which are addition results corresponding to $2N_f$ Doppler frequency components at each discrete time point k, for each period $(T_r \times N_p \times N_c)$ that is $N_p \times N_c$ times of the radar transmission interval $T_r$.

In order to detect inter-antenna phase differences of reflection waves from a target, the arrival-direction estimator 215c calculates a correlation vector Hp(k, $f_s$, w) for each discrete time point k and for each Doppler frequency $f_s$, on the basis of the outputs $FT\_CI^1$(k, $f_s$, w), . . . , and $FT\_CI^{N\_Rx}$(k, $f_s$, w) from the doppler-frequency analyzers 211c in the respective reception antenna systems 214c_1 to 214c_N_Rx, as in the third embodiment. Subsequent processing is substantially the same as that in the third embodiment.

As described above, the radar device 10c according to the fourth embodiment includes the plurality of wireless transmitters 103b and the plurality of transmission antennas 104b, and a transmission-beam controller 600 varies the directions of transmission beams transmitted from the respective transmission antennas 104b to directions in corresponding predetermined ranges and transmits the transmission beams in the plurality of directions. The reception antenna systems 214c then receive reflection waves from the plurality of directions, and the arrival-direction estimator 215c estimates the arrival directions of the reflection waves received by the respective reception antenna system 214c. By estimating the direction in which the maximum value of the evaluation function value P(D(θ), k, $f_s$, w) based on the correlation vector Hp(k, $f_s$, w), which indicates a correlation for the arrival direction for each reflection wave, is obtained, it is possible to improve the detection accuracy of Doppler frequencies.

Since the radar transmission signal is transmitted in the transmission beam range determined by the transmission-beam controller 600, as described above, the radar detection range can be further increased, the accuracy of correcting Doppler frequencies due to movement of the moving object can be improved, and the maximum-speed detection range can be increased, in addition to the advantages obtained in the first and second embodiments.

Fifth Embodiment

As described above in the section "Situation from Which Present Disclosure was Derived", when an output of the adder includes a Doppler frequency component that exceeds $fd_s/2$ ($fd_s$ is a sampling frequency) or includes a Doppler frequency component that is smaller than $-fd_s/2$, the sampling theorem is not satisfied, and aliasing occurs in a frequency analysis result of the doppler-frequency analyzer. A description in a fifth embodiment of the present disclosure will be given of a radar device 10d that can avoid an event in which aliasing occurs in a frequency analysis result of the doppler-frequency analyzer.

Figure 13:
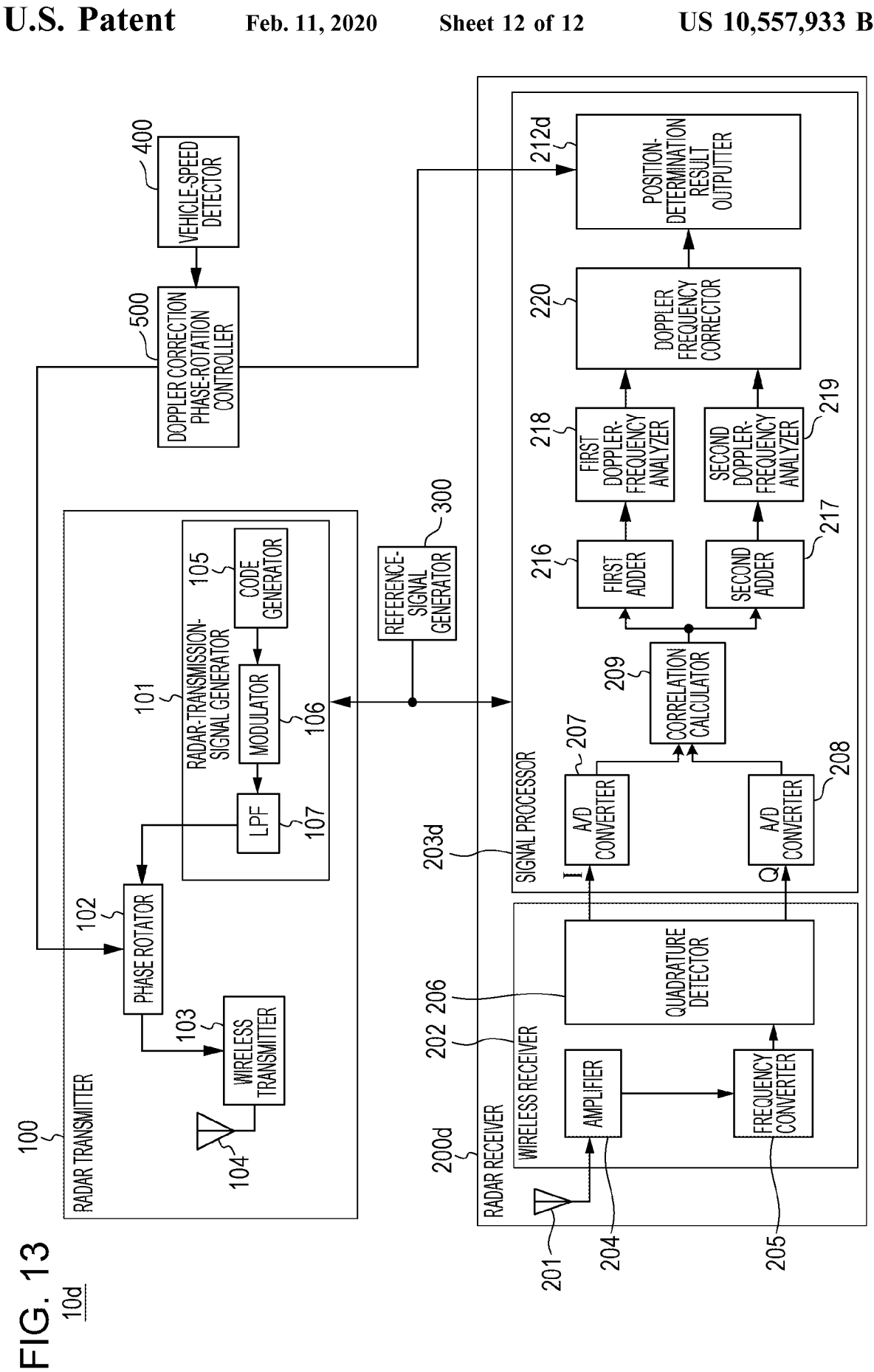
FIG. 13 is a block diagram illustrating the configuration of a radar device according to a fifth embodiment.

FIG. 13 is a block diagram illustrating the configuration of the radar device 10d according to the fifth embodiment. As illustrated in FIG. 13, the radar device 10d includes a radar transmitter 100, a radar receiver 200d, a reference-signal generator 300, a vehicle-speed detector 400, and a doppler correction phase-rotation controller 500, as in the first embodiment. The radar device 10d is assumed to be mounted on a vehicle (not illustrated), which is one example of a moving object.

Since the radar transmitter 100, the reference-signal generator 300, the vehicle-speed detector 400, and the doppler correction phase-rotation controller 500 in the radar device 10d according to the fifth embodiment are substantially the same as those in the first embodiment, descriptions thereof are not given hereinafter.

In FIG. 13, the radar receiver 200d according to the fifth embodiment includes a signal processor 203d, which includes a first adder 216, a second adder 217, a first doppler-frequency analyzer 218, a second doppler-frequency analyzer 219, and a doppler frequency corrector 220. These constituent elements will be described below.

The first adder 216 performs a first number of additions, $N_{p1}$, in which a correlation calculation value AC(k, M) obtained for each radar transmission interval $T_r$ (i.e., for each discrete time point k) and output from the correlation calculator 209 is a unit of addition. This addition may be performed using a method that is analogous to that for the adder 210 described above in the first embodiment.

The second adder 217 performs a second number of additions, $N_{p2}$, in which the correlation calculation value AC(k, M) obtained for each radar transmission interval $T_r$ (i.e., for each discrete time point k) and output from the correlation calculator 209 is a unit of addition. The second number of additions, $N_{p2}$, is smaller than the first number of additions, $N_{p1}$. This addition may be performed using a method that is analogous to that for the adder 210 described above in the first embodiment.

The first doppler-frequency analyzer 218 performs Doppler-frequency analysis on an addition result of the first adder 216. This Doppler-frequency analysis may be performed using a method that is analogous to that for the doppler-frequency analyzer 211 described above in the first embodiment.

The second doppler-frequency analyzer 219 performs Doppler-frequency analysis on an addition result of the second adder 217. This Doppler-frequency analysis may be performed using a method that is analogous to that for the doppler-frequency analyzer 211 described above in the first embodiment.

Outputs (analysis results) of the first doppler-frequency analyzer 218 and the second doppler-frequency analyzer 219 have values in which amplitude phase responses to Doppler frequency components in signals input to the first adder 216 and the second adder 217 are reflected, respectively.

On the basis of amplitudes or phase output characteristics that are different between the first adder 216 and the second adder 217, the doppler frequency corrector 220 corrects Doppler frequency aliasing components. More specifically, with respect to the wth output of the second doppler-frequency analyzer 219, the doppler frequency corrector 220 selects a highest Doppler frequency (a peak spectrum) $f_{s\_peak1}$ from a Doppler frequency response for each discrete time point k. The doppler frequency corrector 220 then calculates a difference between the selected highest Doppler frequency $f_{s\_peak1}$ and an amplitude response of the first doppler-frequency analyzer 218 by using expression (28) below. When the difference is larger than or equal to zero, the doppler frequency corrector 220 determines that there is no Doppler frequency aliasing, and when the result of the calculation in expression (28) indicates a negative value, the doppler frequency corrector 220 determines that there is Doppler frequency aliasing.

$$|FT\_CI_1(k,f_{s\_peak1},w)|^2 - \sqrt{2}|FT\_CI_2(k,f_{s\_peak1},w)|^2 \qquad (28)$$

Upon determining that there is no Doppler frequency aliasing, the doppler frequency corrector 220 omits correcting $f_{s\_peak1}$ and outputs analysis results of the first doppler-frequency analyzer 218 and the second doppler-frequency analyzer 219 to a position-determination result outputter 212d. On the other hand, upon determining that there is Doppler frequency aliasing, the doppler frequency corrector 220 outputs $f_{s\_peak1} - f_{ds}/2$ to the position-determination result outputter 212d as a true Doppler frequency, for $f_{s\_peak1} \geq 0$, and outputs $f_{s\_peak1} + f_{ds}/2$ to the position-determination result outputter 212d as a true Doppler frequency, for $f_{s\_peak1} < 0$.

Alternatively, by calculating a difference between the selected highest Doppler frequency $f_{s\_peak1}$ and a phase response of the second adder 217, the doppler frequency corrector 220 may determine whether or not there is Doppler frequency aliasing.

The position-determination result outputter 212d outputs time point information and the Doppler frequency for an output value of each wth output of the doppler frequency corrector 220, the output value being larger than or equal to a predetermined value. In this case, the position-determination result outputter 212d outputs, as the Doppler frequency, a Doppler frequency ($f_s\Delta\Phi + f_{dm}$) obtained by adding the Doppler frequency $f_{dm}$ determined by the doppler correction phase-rotation controller 500 to the calculated Doppler frequency $f_s\Delta\Phi$. This makes it possible to output a Doppler frequency of a target for which Doppler frequency components due to the speed $V_c$ of the vehicle, which is a moving object on which the radar device 10 is mounted, are corrected.

As described above, in the radar device 10d according to the fifth embodiment, the phase rotator 102 in the radar transmitter 100 pre-performs, on the radar transmission signal, the processing for correcting the Doppler frequency component $f_{dm}$ due to movement of the vehicle, as in the radar device 10 according to the first embodiment. Since the Doppler frequency $f_{dm}$ due to movement of the vehicle increases as the speed of the vehicle increases, it is possible to increase the detection range of Doppler frequencies.

In addition, in the radar device 10d according to the fifth embodiment, the doppler frequency corrector 220 determines whether or not a Doppler frequency included in a reflection wave has aliasing noise, on the basis of an analysis result of the first doppler-frequency analyzer 218, which performs Doppler-frequency analysis by using an addition result of the first adder 216, and an analysis result of the second doppler-frequency analyzer 219, which performs Doppler-frequency analysis by using an addition result of the second adder 217, and when the Doppler frequency has aliasing noise, the doppler frequency corrector 220 performs the correction. Accordingly, the position-determination result outputter 212d, which calculates a target-position-determination result on the basis of an output of the doppler frequency corrector 220, can obtain an output result $[-fd_s/2+f_{dm}, fd_s/2+f_{dm}]$ that satisfies the sampling theorem. That is, it is possible to reduce aliasing noise in Doppler frequencies included in reflection waves from a target.

The present disclosure may also be implemented by an appropriate combination of the operations in the above-described embodiments and the modification.

Although not illustrated, each of the radar devices 10, 10a, 10b, 10c, and 10d in the above-described embodiments has, for example, a central processing unit (CPU), a storage medium, such as a read only memory (ROM), in which a control program is stored, and a work memory, such as a random-access memory (RAM). In this case, the functions of the above-described constituent elements are realized by the CPU executing the control program. The hardware configurations of the radar devices 10, 10a, 10b, 10c, and 10d are not limited to the above-described examples. For example, the functional elements of each of the radar devices 10, 10a, 10b, 10c, and 10d may be realized as an integrated circuit (IC). The functional elements may be individually integrated into single chips or at least one or all of the functional elements may be integrated into a single chip.

Although the description in each embodiment has been given of an example in which the present disclosure is realized using hardware, the present disclosure can also be realized using software in cooperation with hardware.

The functional blocks used in the description of each embodiment can typically be realized as a large-scale integrated (LSI) circuit having an input terminal and an output terminal. The functional blocks may be individually integrated into single chips or at least one or all of the functional blocks may be integrated into a single chip. Although the functional blocks are implemented in the form of an LSI in this case, they may also be called an IC, a system LSI, a super LSI, or an ultra LSI depending on a difference in the degree of integration.

The scheme for integrating the functional blocks into an integrated circuit is not limited to a scheme for LSI and may be realized with a dedicated circuit or a general-purpose processor. The functional blocks can also be implemented using a field programmable gate array (FPGA) that can be programmed after manufacture of an LSI or a reconfigurable processor that allows reconfiguration of connections or settings of circuit cells in an LSI.

In addition, when a technology for circuit integration that replaces LSI becomes available with the advancement of a semiconductor technology or another derivative technology, such a technology may also naturally be used to integrate the functional blocks. For example, biotechnology is applicable to the integration.

BRIEF SUMMARY OF PRESENT DISCLOSURE

A radar device in the present disclosure is directed to a radar device mounted on a moving object. The radar devices includes: a radar transmitter, which in operation, repeatedly transmits a corrected radar transmission signal in each radar transmission interval $T_r$, the corrected radar transmission signal including pulse compression codes and having a corrected Doppler frequency component based on a movement speed of the moving object; a radar receiver, which in operation, includes one or more reception branches, each receiving a reflection wave signal resulting from reflection of the corrected radar transmission signal by a target; and a doppler correction phase-rotation controller, which in operation, determines a Doppler correction phase-rotation amount for correcting the Doppler frequency component, based on the movement speed of the moving object. The radar transmitter includes: a radar-transmission-signal generator, which in operation, generates a radar transmission signal; and a phase rotator, which in operation, corrects the radar transmission signal for each radar transmission interval $T_r$, based on the Doppler correction phase-rotation amount, and that outputs the corrected radar transmission signal. The radar receiver includes a position-determination result outputter, which in operation, calculates a position-determination result of the target by using a result of Doppler-frequency analysis on the reflection wave signal received by the one or more reception branches and the Doppler correction phase-rotation amount.

In the radar device in the present disclosure, the radar receiver may include: a sampler, which in operation, performs discrete sampling on the received reflection wave signal at predetermined discrete time points; a correlation calculator, which in operation, calculates values of correlation between each of results of the discrete sampling and each of the plurality of pulse compression codes for the corresponding radar transmission intervals $T_r$; an adder, which in operation, outputs an addition result of adding the correlation value $N_p$ times, the correlation value being calculated for each radar transmission interval $T_r$, the addition being performed each of $N_p$ times of radar transmission interval $T_r$; and a doppler-frequency analyzer, which in operation, performs Doppler-frequency analysis based on $N_c$ additional results, the $N_c$ additional results being obtained in one measurement period, the one measurement period being $N_p \times N_c$ times of the radar transmission interval $T_r$.

In the radar device in the present disclosure, the Doppler correction phase-rotation amount may be the same in the measurement period.

The radar device in the present disclosure may further include a transmission-beam controller, which in operation, determines a beam direction of each of one or more transmission antennas; the doppler correction phase-rotation controller may determine a Doppler correction phase-rotation amount for correcting the Doppler frequency component, based on the movement speed of the moving object and the beam direction of each of the transmission antennas; the radar transmitter may include the one or more transmission antennas, each transmitting the corrected radar transmission signal in the corresponding determined beam direction; the radar receiver may include an arrival-direction estimator, which in operation, estimates an arrival direction of the reflection wave signal, based on an analysis result of Doppler-frequency analysis on the reflection wave signal received by each of the one or more reception branches; and the position-determination result outputter may calculate a position-determination result of the target, based on the estimated arrival direction and the Doppler correction phase-rotation amount for the beam direction of each transmission antenna.

In the radar device in the present disclosure, the radar receiver may include: a sampler, which in operation, discretely samples the received reflection wave signal at determined discrete time points; a correlation calculator, which in operation, calculates values of correlation between each of results of the discrete sampling and each of the plurality of pulse compression codes for the corresponding radar transmission intervals $T_r$; a first adder, which in operation, performs addition on the correlation value, calculated for each radar transmission interval $T_r$, $N_{p1}$ times for the respective $N_{p1}$ radar transmission intervals $T_r$ to output a first addition result; a second adder, which in operation, performs addition on the correlation value, calculated for each radar transmission interval $T_r$, $N_{p2}$ times for the respective $N_{p2}$ radar transmission intervals $T_r$, $N_{p2}$ being smaller than $N_{p1}$ to output a second addition result; a first doppler-frequency analyzer, which in operation, performs first Doppler-frequency analysis on the first addition result each the $N_{p1}$ radar transmission intervals $T_r$; a second doppler-frequency analyzer, which in operation, performs second Doppler-frequency analysis on the second addition result each the $N_{p2}$ radar transmission intervals $T_r$; and a doppler frequency corrector, which in operation, determines whether or not the reflection wave signal received by the one or more reception branches has Doppler frequency aliasing, based on a result of the first Doppler-frequency analysis and a result of the second Doppler-frequency analysis, and that corrects, when the reflection wave signal has Doppler frequency aliasing, a Doppler frequency included in the reflection wave signal received by the one or more reception branches, based on the result of the first Doppler-frequency analysis and the result of the second Doppler-frequency analysis. When the reflection wave signal received by the one or more reception branches has Doppler frequency aliasing, the position-determination result outputter may calculate a position-determination result of the target by using the one or more reflection wave signals having the corrected Doppler frequency and the Doppler correction phase-rotation amount.

Another radar device in the present disclosure is directed to a radar device mounted on a moving object. The radar device includes: a radar transmitter, which in operation, repeatedly transmits a corrected radar transmission signal including pulse compression codes in each radar transmission interval $T_r$; a radar receiver, which in operation, includes one or more reception branches that receive one or more reflection wave signals resulting from reflection of the corrected radar transmission signal by a target; and a doppler correction phase-rotation controller, which in operation, determines a Doppler correction phase-rotation amount for correcting a Doppler frequency component, based on a movement speed of the moving object. The one or more receiving branch includes: a phase rotator, which in operation, corrects the one or more received reflection wave signals for each radar transmission interval $T_r$, based on the Doppler correction phase-rotation amount; and a position-determination result outputter, which in operation, calculates a position-determination result of the target by using a result of Doppler-frequency analysis on the one or more corrected reflection wave signals and the Doppler correction phase-rotation amount.

The radar device in the present disclosure includes: a transmission-beam controller, which in operation, determines a beam direction of each of one or more transmission antennas. The radar transmitter includes the one or more transmission antennas, each transmitting the corrected radar transmission signal in the corresponding determined beam direction; the doppler correction phase-rotation controller determines a Doppler correction phase-rotation amount for correcting the Doppler frequency component, based on the movement speed of the moving object and the beam direction of each transmission antenna; the radar receiver further includes an arrival-direction estimator, which in operation, estimates an arrival direction of the reflection wave signal received by each of the one or more reception branches, based on an analysis result of the Doppler-frequency analysis on the reflection wave signal; and the position-determination result outputter calculates a position-determination result of the target, based on the estimated arrival direction and the Doppler correction phase-rotation amount for the beam direction of each of the transmission antenna.

A position-determination method in the present disclosure includes determining a Doppler correction phase-rotation amount for correcting a Doppler frequency component based on a movement speed of a moving object; correcting a radar transmission signal including pulse compression codes for each radar transmission interval $T_r$, based on the Doppler correction phase-rotation amount; repeatedly transmitting, by a radar transmitter mounted on the moving object, the corrected radar transmission signal in each radar transmission interval $T_r$; receiving, by a radar receiver including one or more reception branches and mounted on the moving object, a reflection wave signal resulting from reflection of the corrected radar transmission signal by a target; and calculating a position-determination result of the target by using a result of Doppler-frequency analysis on the reflection wave signal received by the one or more reception branches and the Doppler correction phase-rotation amount.

A position-determination method in the present disclosure includes: determining a Doppler correction phase-rotation amount for correcting a Doppler frequency component based on a movement speed of a moving object; repeatedly transmitting, by a radar transmitter mounted on the moving object, a radar transmission signal including pulse compression codes in each radar transmission interval $T_r$; receiving, by a radar receiver including one or more reception branches and mounted on the moving object, the one or more reflection wave signals resulting from reflection of the corrected radar transmission signal by a target; correcting the received one or more reflection wave signals for each radar transmission interval $T_r$, based on the Doppler correction phase-rotation amount; and calculating a position-determination result of the target by using a result of Doppler-frequency analysis on the one or more corrected reflection wave signals and the Doppler correction phase-rotation amount.

The present disclosure is useful as a radar device that detects a relative speed between the radar device and a target by detecting a Doppler frequency.

What is claimed is:

1. A radar device mounted on a moving object, comprising:
   a doppler correction phase-rotation controller, which in operation, determines a Doppler correction phase-rotation amount for correcting a Doppler frequency component, based on a movement speed of the moving object;
   a radar transmitter, which in operation, repeatedly transmits a corrected radar transmission signal in each radar transmission interval $T_r$, the corrected radar transmission signal including pulse compression codes and being corrected based on the Doppler frequency component; and
   a radar receiver, which in operation, includes one or more reception branches, each receiving a reflection wave signal resulting from reflection of the corrected radar transmission signal by a target,
   wherein the radar transmitter includes
      a radar-transmission-signal generator, which in operation, generates a radar transmission signal, and
      a phase rotator, which in operation, corrects the radar transmission signal for each radar transmission interval $T_r$, based on the Doppler correction phase-rotation amount, and that outputs the corrected radar transmission signal; and
   wherein the radar receiver includes
      a position-determination result outputter, which in operation, calculates a position-determination result of the target by using a result of Doppler-frequency analysis on the reflection wave signal received by the one or more reception branches and the Doppler correction phase-rotation amount.

2. The radar device according to claim 1,
   wherein the radar receiver includes:
      a sampler, which in operation, performs discrete sampling on the received reflection wave signal at determined discrete time points;
      a correlation calculator, which in operation, calculates correlation values between each of results of the discrete sampling and each of the plurality of pulse compression codes for the corresponding radar transmission intervals $T_r$;
      an adder, which in operation, outputs an addition result of adding the correlation value $N_p$ times, the correlation value being calculated for each radar transmission interval $T_r$, the addition being performed each of $N_p$ times of radar transmission interval $T_r$; and
      a doppler-frequency analyzer, which in operation, performs Doppler-frequency analysis based on $N_c$ additional results, the $N_c$ additional results being obtained in one measurement period, the one measurement period being $N_p \times N_c$ times of the radar transmission interval $T_r$.

3. The radar device according to claim 1,
   wherein the Doppler correction phase-rotation amount is the same in the measurement period.

4. The radar device according to claim 1, comprising:
   a transmission-beam controller, which in operation, determines a beam direction of each of one or more transmission antennas,
   wherein
      the doppler correction phase-rotation controller determines a Doppler correction phase-rotation amount for correcting the Doppler frequency component based on the movement speed of the moving object and the beam direction of each of the transmission antennas;
      the radar transmitter includes the one or more transmission antennas, each transmitting the corrected radar transmission signal in the corresponding determined beam direction;
      the radar receiver includes an arrival-direction estimator that estimates an arrival direction of the reflection wave signal based on an analysis result of Doppler-frequency analysis on the reflection wave signal received by each of the one or more reception branches; and
      the position-determination result outputter calculates a position-determination result of the target, based on the estimated arrival direction and the Doppler correction phase-rotation amount for the beam direction of each of the transmission antennas.

5. The radar device according to claim 1,
   wherein the radar receiver includes:
      a sampler, which in operation, discretely samples the received reflection wave signal at determined discrete time points;
      a correlation calculator, which in operation, calculates values of correlation between each of results of the discrete sampling and each of the plurality of pulse compression codes for the corresponding radar transmission intervals $T_r$;
      a first adder, which in operation, performs addition on the correlation value, calculated for each radar transmission interval $T_r$, $N_{p1}$ times for the respective $N_{p1}$ radar transmission intervals $T_r$ to output a first addition result;
      a second adder, which in operation, performs addition on the correlation value, calculated for each radar transmission interval $T_r$, $N_{p2}$ times for the respective $N_{p2}$ radar transmission intervals $T_r$, $N_{p2}$ being smaller than $N_{p1}$, to output a second addition result;
      a first doppler-frequency analyzer, which in operation, performs first Doppler-frequency analysis on the first addition result each the $N_{p1}$ radar transmission intervals $T_r$;
      a second doppler-frequency analyzer, which in operation, performs second Doppler-frequency analysis on the second addition result each the $N_{p2}$ radar transmission intervals $T_r$; and
      a doppler frequency corrector, which in operation, determines whether or not the reflection wave signal received by the one or more reception branches has Doppler frequency aliasing, based on a result of the first Doppler-frequency analysis and a result of the second Doppler-frequency analysis, and that corrects, when the reflection wave signal has Doppler frequency aliasing, a Doppler frequency included in the reflection wave signal received by the one or more reception branches, based on the result of the first Doppler-frequency analysis and the result of the second Doppler-frequency analysis, and
   wherein, when the reflection wave signal received by the one or more reception branches has Doppler frequency aliasing, the position-determination result outputter calculates a position-determination result of the target by using the one or more reflection wave signals having the corrected Doppler frequency and the Doppler correction phase-rotation amount.

6. A position-determination method comprising:
- determining a Doppler correction phase-rotation amount for correcting a Doppler frequency component based on a movement speed of a moving object;
- correcting a radar transmission signal including pulse compression codes for each radar transmission interval $T_r$, based on the Doppler correction phase-rotation amount;
- repeatedly transmitting, by a radar transmitter mounted on the moving object, the corrected radar transmission signal in each radar transmission interval $T_r$;
- receiving, by a radar receiver including one or more reception branches and mounted on the moving object, a reflection wave signal resulting from reflection of the corrected radar transmission signal by a target; and
- calculating a position-determination result of the target by using a result of Doppler-frequency analysis on the reflection wave signal received by the one or more reception branches and the Doppler correction phase-rotation amount.

* * * * *